United States Patent
Wyatt et al.

(10) Patent No.: US 9,215,074 B2
(45) Date of Patent: *Dec. 15, 2015

(54) EXPRESSING INTENT TO CONTROL BEHAVIOR OF APPLICATION COMPONENTS

(71) Applicant: Lookout, Inc., San Francisco, CA (US)

(72) Inventors: Timothy Micheal Wyatt, San Francisco, CA (US); Kevin Mahaffey, San Francisco, CA (US); Derek Joseph Halliday, San Francisco, CA (US); David Richardson, San Francisco, CA (US)

(73) Assignee: Lookout, Inc., San Francisco, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 13/786,210

(22) Filed: Mar. 5, 2013

(65) Prior Publication Data

US 2013/0326477 A1    Dec. 5, 2013

Related U.S. Application Data

(63) Continuation of application No. 13/692,806, filed on Dec. 3, 2012.

(60) Provisional application No. 61/655,822, filed on Jun. 5, 2012.

(51) Int. Cl.
*G06F 9/445* (2006.01)
*G06F 12/14* (2006.01)
(Continued)

(52) U.S. Cl.
CPC ............... *H04L 9/3247* (2013.01); *G06F 8/60* (2013.01); *G06F 8/70* (2013.01); *G06F 21/44* (2013.01);
(Continued)

(58) Field of Classification Search
CPC ....... G06F 8/60; G06F 17/5009; G06F 9/445; G06F 11/362; G06F 11/008; G06F 21/577; G06F 21/552; G06F 21/566; G06F 8/70; G06F 2201/865; G06F 21/57; G06F 21/629; G06F 2221/033
See application file for complete search history.

(56) References Cited

U.S. PATENT DOCUMENTS 3,416,032 A    12/1968  Jahns et al.
4,553,257 A    11/1985  Mori et al.
(Continued)

FOREIGN PATENT DOCUMENTS

EP    2765750    8/2014
GB    2430588    3/2007
(Continued)

OTHER PUBLICATIONS

Gianluigi Caldiera et al.; Identifying and Qualifying Reusable Software Components; 1991 IEEE; pp. 61-70; <http://ieeexplore.ieee.org/stamp/stamp.jsp?tp=&arnumber=67210>.*
(Continued)

*Primary Examiner* — Thuy Dao
*Assistant Examiner* — Cuong V Luu
(74) *Attorney, Agent, or Firm* — Greenberg Traurig LLP

(57) ABSTRACT

Detection, identification, and control of application behavior dealing with malware, security risks, data privacy, or resource usage can be difficult in an era of complex, composite software applications composed of multiple components. Software applications are analyzed to determine their components and to identify the behaviors associated with each of the components. Components can also be analyzed with respect to similarity of previously known components. Behaviors can include use of personal identifying information or device information, or any actions that can be taken by applications on the device, including user interface displays, notifications, network communications, and file reading or writing actions. Policies to control or restrict the behavior of applications and their components may be defined and applied. In one embodiment this can include the identification of advertising networks and defining policies to permit various opt-out actions for these advertising networks.

23 Claims, 8 Drawing Sheets

(51) Int. Cl.

| | | |
|---|---|---|
| H04L 9/32 | (2006.01) | |
| G06F 9/44 | (2006.01) | |
| G06Q 30/02 | (2012.01) | |
| G06F 21/44 | (2013.01) | |
| H04L 12/26 | (2006.01) | |
| G06F 21/57 | (2013.01) | |

(52) U.S. Cl.
CPC .............. *G06F 21/57* (2013.01); *G06F 21/577* (2013.01); *G06Q 30/0241* (2013.01); *H04L 43/04* (2013.01); *H04L 43/06* (2013.01)

(56) References Cited

U.S. PATENT DOCUMENTS

| | | | |
|---|---|---|---|
| 5,319,776 | A | 6/1994 | Hile et al. |
| 5,574,775 | A | 11/1996 | Miller, II et al. |
| 5,715,518 | A | 2/1998 | Barrere et al. |
| 6,185,689 | B1 | 2/2001 | Todd, Sr. et al. |
| 6,269,456 | B1 | 7/2001 | Hodges et al. |
| 6,272,353 | B1 | 8/2001 | Dicker et al. |
| 6,301,668 | B1 | 10/2001 | Gleichauf et al. |
| 6,453,345 | B2 | 9/2002 | Trcka et al. |
| 6,502,131 | B1 | 12/2002 | Vaid et al. |
| 6,529,143 | B2 | 3/2003 | Mikkola et al. |
| 6,696,941 | B2 | 2/2004 | Baker |
| 6,707,476 | B1 | 3/2004 | Hochstedler |
| 6,792,543 | B2 | 9/2004 | Pak et al. |
| 6,892,225 | B1 | 5/2005 | Tu et al. |
| 6,907,530 | B2 | 6/2005 | Wang |
| 6,959,184 | B1 | 10/2005 | Byers et al. |
| 7,020,895 | B2 | 3/2006 | Albrecht |
| 7,023,383 | B2 | 4/2006 | Stilp et al. |
| 7,069,589 | B2 | 6/2006 | Schmall et al. |
| 7,096,368 | B2 | 8/2006 | Kouznetsov et al. |
| 7,123,933 | B2 | 10/2006 | Poor et al. |
| 7,127,455 | B2 | 10/2006 | Carson et al. |
| 7,159,036 | B2 | 1/2007 | Hinchliffe et al. |
| 7,159,237 | B2 | 1/2007 | Schneier et al. |
| 7,171,690 | B2 | 1/2007 | Kouznetsov et al. |
| 7,178,166 | B1 | 2/2007 | Taylor et al. |
| 7,181,252 | B2 | 2/2007 | Komsi |
| 7,210,168 | B2 | 4/2007 | Hursey et al. |
| 7,228,566 | B2 | 6/2007 | Caceres et al. |
| 7,236,598 | B2 | 6/2007 | Sheymov et al. |
| 7,237,264 | B1 | 6/2007 | Graham et al. |
| 7,266,810 | B2 | 9/2007 | Karkare et al. |
| 7,266,845 | B2 | 9/2007 | Hypponen |
| 7,290,276 | B2 | 10/2007 | Ogata |
| 7,304,570 | B2 | 12/2007 | Thomas et al. |
| 7,305,245 | B2 | 12/2007 | Alizadeh-Shabdiz et al. |
| 7,308,256 | B2 | 12/2007 | Morota et al. |
| 7,308,712 | B2 | 12/2007 | Banzhof |
| 7,325,249 | B2 | 1/2008 | Sutton, Jr. et al. |
| 7,346,605 | B1 | 3/2008 | Hepworth et al. |
| 7,356,835 | B2 | 4/2008 | Gancarcik et al. |
| 7,376,969 | B1 | 5/2008 | Njemanze et al. |
| 7,386,297 | B2 | 6/2008 | An |
| 7,392,043 | B2 | 6/2008 | Kouznetsov et al. |
| 7,392,543 | B2 | 6/2008 | Szor |
| 7,397,424 | B2 | 7/2008 | Houri |
| 7,397,434 | B2 | 7/2008 | Mun et al. |
| 7,401,064 | B1 | 7/2008 | Arone et al. |
| 7,401,359 | B2 | 7/2008 | Gartside et al. |
| 7,403,762 | B2 | 7/2008 | Morgan et al. |
| 7,414,988 | B2 | 8/2008 | Jones et al. |
| 7,415,270 | B2 | 8/2008 | Wilhelmsson et al. |
| 7,415,536 | B2 | 8/2008 | Nakazawa |
| 7,433,694 | B2 | 10/2008 | Morgan et al. |
| 7,437,158 | B2 | 10/2008 | Russell |
| 7,467,206 | B2 | 12/2008 | Moore et al. |
| 7,471,954 | B2 | 12/2008 | Brachet et al. |
| 7,472,422 | B1 | 12/2008 | Agbabian |
| 7,474,897 | B2 | 1/2009 | Morgan et al. |
| 7,493,127 | B2 | 2/2009 | Morgan et al. |
| 7,493,403 | B2 | 2/2009 | Shull et al. |
| 7,502,620 | B2 | 3/2009 | Morgan et al. |
| 7,515,578 | B2 | 4/2009 | Alizadeh-Shabdiz et al. |
| 7,525,541 | B2 | 4/2009 | Chun et al. |
| 7,526,297 | B1 | 4/2009 | Holur et al. |
| 7,539,882 | B2 | 5/2009 | Jessup et al. |
| 7,551,579 | B2 | 6/2009 | Alizadeh-Shabdiz et al. |
| 7,551,929 | B2 | 6/2009 | Alizadeh-Shabdiz et al. |
| 7,568,220 | B2 | 7/2009 | Burshan |
| 7,610,273 | B2 | 10/2009 | Kuppusamy et al. |
| 7,634,800 | B2 | 12/2009 | Ide et al. |
| 7,685,132 | B2 | 3/2010 | Hyman |
| 7,696,923 | B2 | 4/2010 | Houri |
| 7,761,583 | B2 | 7/2010 | Shull et al. |
| 7,768,963 | B2 | 8/2010 | Alizadeh-Shabdiz |
| 7,769,396 | B2 | 8/2010 | Alizadeh-Shabdiz et al. |
| 7,774,637 | B1 | 8/2010 | Beddoe et al. |
| 7,783,281 | B1 | 8/2010 | Cook et al. |
| 7,809,353 | B2 | 10/2010 | Brown et al. |
| 7,809,366 | B2 | 10/2010 | Rao et al. |
| 7,809,936 | B2 | 10/2010 | Einloth et al. |
| 7,813,745 | B2 | 10/2010 | Li |
| 7,818,017 | B2 | 10/2010 | Alizadeh-Shabdiz et al. |
| 7,835,754 | B2 | 11/2010 | Alizadeh-Shabdiz et al. |
| 7,856,234 | B2 | 12/2010 | Alizadeh-Shabdiz et al. |
| 7,856,373 | B2 | 12/2010 | Ullah |
| 7,861,303 | B2 | 12/2010 | Kouznetsov et al. |
| 7,877,784 | B2 | 1/2011 | Chow et al. |
| 7,882,247 | B2 | 2/2011 | Sturniolo et al. |
| 7,882,557 | B2 | 2/2011 | Coskun et al. |
| 7,890,938 | B2 | 2/2011 | Jensen et al. |
| 7,907,966 | B1 | 3/2011 | Mammen |
| 7,916,661 | B2 | 3/2011 | Alizadeh-Shabdiz et al. |
| 7,978,691 | B1 | 7/2011 | Cole |
| 7,991,854 | B2 | 8/2011 | Bahl |
| 7,999,742 | B2 | 8/2011 | Alizadeh-Shabdiz |
| 8,001,610 | B1 | 8/2011 | Chickering et al. |
| 8,014,788 | B2 | 9/2011 | Alizadeh-Shabdiz et al. |
| 8,019,357 | B2 | 9/2011 | Alizadeh-Shabdiz et al. |
| 8,031,657 | B2 | 10/2011 | Jones et al. |
| 8,037,203 | B2 | 10/2011 | Accapadi et al. |
| 8,054,219 | B2 | 11/2011 | Alizadeh-Shabdiz |
| 8,087,082 | B2 | 12/2011 | Bloch et al. |
| 8,089,398 | B2 | 1/2012 | Alizadeh-Shabdiz |
| 8,089,399 | B2 | 1/2012 | Alizadeh-Shabdiz |
| 8,090,386 | B2 | 1/2012 | Alizadeh-Shabdiz et al. |
| 8,095,172 | B1 | 1/2012 | Cole et al. |
| 8,099,764 | B2 | 1/2012 | Herzog et al. |
| 8,108,555 | B2 | 1/2012 | Awadallah et al. |
| 8,112,797 | B2 | 2/2012 | Coskun et al. |
| 8,121,617 | B1 | 2/2012 | LaGrotta et al. |
| 8,126,456 | B2 | 2/2012 | Lotter et al. |
| 8,126,866 | B1 * | 2/2012 | Barton et al. .................. 707/706 |
| 8,127,158 | B2 | 2/2012 | Jessup et al. |
| 8,127,350 | B2 | 2/2012 | Wei et al. |
| 8,127,358 | B1 | 2/2012 | Lee |
| 8,135,395 | B2 | 3/2012 | Cassett et al. |
| 8,195,196 | B2 | 6/2012 | Haran et al. |
| 8,200,773 | B2 | 6/2012 | Bluestone et al. |
| 8,214,910 | B1 | 7/2012 | Gossweiler, III et al. |
| 8,259,568 | B2 | 9/2012 | Laudermilch et al. |
| 8,261,351 | B1 | 9/2012 | Thornewell et al. |
| 8,266,288 | B2 | 9/2012 | Banerjee et al. |
| 8,266,324 | B2 | 9/2012 | Baratakke et al. |
| 8,346,860 | B2 | 1/2013 | Berg et al. |
| 8,356,080 | B2 | 1/2013 | Luna et al. |
| 8,359,016 | B2 * | 1/2013 | Lindeman et al. ......... 455/414.1 |
| 8,364,785 | B2 | 1/2013 | Plamondon |
| 8,370,580 | B2 | 2/2013 | Mobarak et al. |
| 8,370,933 | B1 | 2/2013 | Buckler |
| 8,401,521 | B2 | 3/2013 | Bennett et al. |
| 8,447,856 | B2 | 5/2013 | Drako |
| 8,463,915 | B1 | 6/2013 | Kim |
| 8,464,335 | B1 | 6/2013 | Sinha et al. |
| 8,484,332 | B2 | 7/2013 | Bush et al. |
| 8,504,775 | B2 | 8/2013 | Plamondon |
| 8,589,691 | B1 | 11/2013 | Hackborn et al. |
| 8,650,558 | B2 | 2/2014 | DePoy |
| 8,650,649 | B1 | 2/2014 | Chen et al. |

(56) References Cited

U.S. PATENT DOCUMENTS

| | | | |
|---|---|---|---|
| 8,701,192 B1* | 4/2014 | Glick et al. .................. 726/24 |
| 8,756,432 B1 | 6/2014 | Chen et al. |
| 8,814,650 B2* | 8/2014 | Cockerille et al. ............ 463/16 |
| 8,914,893 B2 | 12/2014 | Zhao et al. |
| 2001/0044339 A1 | 11/2001 | Cordero et al. |
| 2002/0042886 A1 | 4/2002 | Lahti et al. |
| 2002/0087483 A1 | 7/2002 | Harif |
| 2002/0108005 A1 | 8/2002 | Larson et al. |
| 2002/0108058 A1 | 8/2002 | Iwamura |
| 2002/0183060 A1 | 12/2002 | Ko et al. |
| 2002/0191018 A1 | 12/2002 | Broussard |
| 2003/0028803 A1 | 2/2003 | Bunker, V et al. |
| 2003/0046134 A1 | 3/2003 | Frolick et al. |
| 2003/0079145 A1 | 4/2003 | Kouznetsov et al. |
| 2003/0115485 A1 | 6/2003 | Milliken |
| 2003/0120951 A1 | 6/2003 | Gartside et al. |
| 2003/0131148 A1 | 7/2003 | Kelley et al. |
| 2003/0233566 A1 | 12/2003 | Kouznetsov et al. |
| 2004/0022258 A1 | 2/2004 | Tsukada et al. |
| 2004/0025042 A1 | 2/2004 | Kouznetsov et al. |
| 2004/0058644 A1 | 3/2004 | Saigo et al. |
| 2004/0133624 A1 | 7/2004 | Park |
| 2004/0158741 A1 | 8/2004 | Schneider |
| 2004/0185900 A1 | 9/2004 | McElveen |
| 2004/0199665 A1 | 10/2004 | Omar et al. |
| 2004/0205419 A1 | 10/2004 | Liang et al. |
| 2004/0209608 A1 | 10/2004 | Kouznetsov et al. |
| 2004/0225887 A1 | 11/2004 | O'Neil et al. |
| 2004/0259532 A1 | 12/2004 | Isomaki et al. |
| 2005/0010821 A1 | 1/2005 | Cooper et al. |
| 2005/0010921 A1 | 1/2005 | Sueyoshi |
| 2005/0015443 A1 | 1/2005 | Levine et al. |
| 2005/0074106 A1 | 4/2005 | Orlamunder et al. |
| 2005/0076246 A1 | 4/2005 | Singhal |
| 2005/0091308 A1 | 4/2005 | Bookman et al. |
| 2005/0125779 A1 | 6/2005 | Kelley et al. |
| 2005/0130627 A1 | 6/2005 | Calmels et al. |
| 2005/0138395 A1 | 6/2005 | Benco et al. |
| 2005/0138413 A1 | 6/2005 | Lippmann et al. |
| 2005/0138450 A1 | 6/2005 | Hsieh |
| 2005/0154796 A1 | 7/2005 | Forsyth |
| 2005/0182792 A1 | 8/2005 | Israel et al. |
| 2005/0186954 A1 | 8/2005 | Kenney |
| 2005/0197099 A1 | 9/2005 | Nehushtan |
| 2005/0221800 A1 | 10/2005 | Jackson et al. |
| 2005/0227669 A1 | 10/2005 | Haparnas |
| 2005/0237970 A1 | 10/2005 | Inoue |
| 2005/0240999 A1 | 10/2005 | Rubin et al. |
| 2005/0254654 A1 | 11/2005 | Rockwell et al. |
| 2005/0278777 A1 | 12/2005 | Loza |
| 2005/0282533 A1 | 12/2005 | Draluk et al. |
| 2006/0026283 A1 | 2/2006 | Trueba |
| 2006/0048142 A1 | 3/2006 | Roese et al. |
| 2006/0073820 A1 | 4/2006 | Craswell et al. |
| 2006/0075388 A1 | 4/2006 | Kelley et al. |
| 2006/0080680 A1 | 4/2006 | Anwar et al. |
| 2006/0095454 A1 | 5/2006 | Shankar et al. |
| 2006/0101518 A1 | 5/2006 | Schumaker et al. |
| 2006/0129601 A1 | 6/2006 | Chang et al. |
| 2006/0130145 A1 | 6/2006 | Choi et al. |
| 2006/0150238 A1 | 7/2006 | D'Agostino |
| 2006/0150256 A1 | 7/2006 | Fanton et al. |
| 2006/0179485 A1 | 8/2006 | Longsine et al. |
| 2006/0191011 A1 | 8/2006 | Korkishko et al. |
| 2006/0217115 A1 | 9/2006 | Cassett et al. |
| 2006/0218482 A1 | 9/2006 | Ralston et al. |
| 2006/0224742 A1 | 10/2006 | Shahbazi |
| 2006/0236325 A1 | 10/2006 | Rao et al. |
| 2006/0253205 A1 | 11/2006 | Gardiner |
| 2006/0253584 A1 | 11/2006 | Dixon et al. |
| 2006/0272011 A1 | 11/2006 | Ide et al. |
| 2006/0277408 A1 | 12/2006 | Bhat et al. |
| 2006/0294582 A1 | 12/2006 | Linsley-Hood et al. |
| 2007/0005327 A1 | 1/2007 | Ferris |
| 2007/0011192 A1 | 1/2007 | Barton |
| 2007/0011319 A1 | 1/2007 | McClure et al. |
| 2007/0015519 A1 | 1/2007 | Casey |
| 2007/0016953 A1 | 1/2007 | Morris et al. |
| 2007/0016955 A1 | 1/2007 | Goldberg et al. |
| 2007/0021112 A1 | 1/2007 | Byrne et al. |
| 2007/0028095 A1 | 2/2007 | Allen et al. |
| 2007/0028302 A1 | 2/2007 | Brennan et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0039053 A1 | 2/2007 | Dvir |
| 2007/0050471 A1 | 3/2007 | Patel et al. |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0154014 A1 | 7/2007 | Aissi et al. |
| 2007/0174472 A1 | 7/2007 | Kulakowski |
| 2007/0174490 A1 | 7/2007 | Choi et al. |
| 2007/0186275 A1 | 8/2007 | Shahbazi |
| 2007/0186282 A1 | 8/2007 | Jenkins |
| 2007/0190995 A1 | 8/2007 | Wang et al. |
| 2007/0214245 A1 | 9/2007 | Hamalainen et al. |
| 2007/0214504 A1 | 9/2007 | Milani Comparetti et al. |
| 2007/0220608 A1 | 9/2007 | Lahti et al. |
| 2007/0240127 A1 | 10/2007 | Roques et al. |
| 2007/0240218 A1 | 10/2007 | Tuvell et al. |
| 2007/0240221 A1 | 10/2007 | Tuvell et al. |
| 2007/0240222 A1 | 10/2007 | Tuvell et al. |
| 2007/0248047 A1 | 10/2007 | Shorty et al. |
| 2007/0250627 A1 | 10/2007 | May et al. |
| 2007/0253377 A1 | 11/2007 | Janneteau et al. |
| 2007/0270212 A1* | 11/2007 | Cockerille et al. ............ 463/29 |
| 2007/0293263 A1 | 12/2007 | Eslambolchi et al. |
| 2007/0297610 A1 | 12/2007 | Chen et al. |
| 2008/0028470 A1 | 1/2008 | Remington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1 | 2/2008 | Demirhan et al. |
| 2008/0065507 A1 | 3/2008 | Morrison et al. |
| 2008/0070495 A1 | 3/2008 | Stricklen et al. |
| 2008/0072329 A1 | 3/2008 | Herschaft |
| 2008/0086638 A1 | 4/2008 | Mather |
| 2008/0086773 A1 | 4/2008 | Tuvell et al. |
| 2008/0086776 A1 | 4/2008 | Tuvell et al. |
| 2008/0109871 A1 | 5/2008 | Jacobs |
| 2008/0120611 A1* | 5/2008 | Aaron .......................... 717/174 |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0186162 A1 | 8/2008 | Rajan et al. |
| 2008/0196104 A1 | 8/2008 | Tuvell et al. |
| 2008/0200160 A1 | 8/2008 | Fitzpatrick et al. |
| 2008/0208950 A1 | 8/2008 | Kim et al. |
| 2008/0209557 A1 | 8/2008 | Herley et al. |
| 2008/0235801 A1 | 9/2008 | Soderberg et al. |
| 2008/0275992 A1 | 11/2008 | Basty et al. |
| 2008/0276111 A1 | 11/2008 | Jacoby et al. |
| 2008/0293396 A1 | 11/2008 | Barnes et al. |
| 2008/0307243 A1 | 12/2008 | Lee |
| 2008/0318562 A1 | 12/2008 | Featherstone et al. |
| 2009/0064330 A1 | 3/2009 | Shraim et al. |
| 2009/0070283 A1 | 3/2009 | Kang et al. |
| 2009/0119143 A1 | 5/2009 | Silver et al. |
| 2009/0172227 A1 | 7/2009 | Taylor et al. |
| 2009/0199298 A1 | 8/2009 | Miliefsky |
| 2009/0205016 A1 | 8/2009 | Milas |
| 2009/0205047 A1 | 8/2009 | Podjarny |
| 2009/0248623 A1 | 10/2009 | Adelman et al. |
| 2009/0282485 A1* | 11/2009 | Bennett ........................ 726/24 |
| 2009/0292487 A1 | 11/2009 | Duncan et al. |

(56) References Cited

U.S. PATENT DOCUMENTS

| | | | |
|---|---|---|---|
| 2009/0293125 A1 | 11/2009 | Szor | |
| 2009/0319998 A1* | 12/2009 | Sobel et al. | 717/128 |
| 2010/0005291 A1 | 1/2010 | Hulten et al. | |
| 2010/0019731 A1 | 1/2010 | Connolly et al. | |
| 2010/0041946 A1 | 2/2010 | Kim | |
| 2010/0058468 A1 | 3/2010 | Green et al. | |
| 2010/0064341 A1 | 3/2010 | Aldera | |
| 2010/0064344 A1 | 3/2010 | Wang | |
| 2010/0088398 A1 | 4/2010 | Plamondon | |
| 2010/0097494 A1 | 4/2010 | Gum et al. | |
| 2010/0100591 A1 | 4/2010 | Mahaffey et al. | |
| 2010/0100939 A1 | 4/2010 | Mahaffey et al. | |
| 2010/0100959 A1 | 4/2010 | Mahaffey | |
| 2010/0100963 A1 | 4/2010 | Mahaffey | |
| 2010/0100964 A1 | 4/2010 | Mahaffey et al. | |
| 2010/0138501 A1 | 6/2010 | Clinton et al. | |
| 2010/0154032 A1 | 6/2010 | Ollmann | |
| 2010/0173658 A1 | 7/2010 | Fan et al. | |
| 2010/0210240 A1 | 8/2010 | Mahaffey et al. | |
| 2010/0240419 A1 | 9/2010 | Horino | |
| 2010/0313270 A1 | 12/2010 | Kim et al. | |
| 2010/0317324 A1 | 12/2010 | Brown et al. | |
| 2010/0332593 A1 | 12/2010 | Barash et al. | |
| 2011/0022681 A1* | 1/2011 | Simeonov | 709/217 |
| 2011/0047033 A1 | 2/2011 | Mahaffey et al. | |
| 2011/0047594 A1 | 2/2011 | Mahaffey et al. | |
| 2011/0047597 A1 | 2/2011 | Mahaffey et al. | |
| 2011/0047620 A1 | 2/2011 | Mahaffey et al. | |
| 2011/0107414 A1 | 5/2011 | Diab et al. | |
| 2011/0119765 A1 | 5/2011 | Hering et al. | |
| 2011/0145920 A1 | 6/2011 | Mahaffey et al. | |
| 2011/0154439 A1 | 6/2011 | Patel et al. | |
| 2011/0171923 A1 | 7/2011 | Daly et al. | |
| 2011/0173071 A1* | 7/2011 | Meyer et al. | 705/14.54 |
| 2011/0235624 A1 | 9/2011 | Scott et al. | |
| 2011/0241872 A1 | 10/2011 | Mahaffey | |
| 2011/0296401 A1 | 12/2011 | DePoy | |
| 2011/0296510 A1 | 12/2011 | Hatlelid et al. | |
| 2012/0011439 A1 | 1/2012 | Karn et al. | |
| 2012/0042257 A1 | 2/2012 | Aftab et al. | |
| 2012/0042382 A1 | 2/2012 | Mahaffey | |
| 2012/0059822 A1 | 3/2012 | Malandain et al. | |
| 2012/0060222 A1 | 3/2012 | Mahaffey et al. | |
| 2012/0072569 A1 | 3/2012 | Xu | |
| 2012/0084836 A1 | 4/2012 | Mahaffey et al. | |
| 2012/0084864 A1 | 4/2012 | Mahaffey et al. | |
| 2012/0096516 A1 | 4/2012 | Sobel et al. | |
| 2012/0096555 A1 | 4/2012 | Mahaffey | |
| 2012/0102568 A1* | 4/2012 | Tarbotton et al. | 726/23 |
| 2012/0110174 A1 | 5/2012 | Wootton et al. | |
| 2012/0124239 A1 | 5/2012 | Shribman et al. | |
| 2012/0129503 A1* | 5/2012 | Lindeman et al. | 455/414.1 |
| 2012/0159434 A1 | 6/2012 | Dang et al. | |
| 2012/0159578 A1 | 6/2012 | Chawla et al. | |
| 2012/0159607 A1 | 6/2012 | Wei et al. | |
| 2012/0159636 A1 | 6/2012 | Pandya et al. | |
| 2012/0173680 A1 | 7/2012 | Coskun et al. | |
| 2012/0179801 A1 | 7/2012 | Luna et al. | |
| 2012/0179814 A1 | 7/2012 | Swildens et al. | |
| 2012/0188064 A1 | 7/2012 | Mahaffey et al. | |
| 2012/0196571 A1 | 8/2012 | Grkov et al. | |
| 2012/0215938 A1 | 8/2012 | Fletcher et al. | |
| 2012/0222120 A1* | 8/2012 | Rim et al. | 726/24 |
| 2012/0233674 A1 | 9/2012 | Gladstone et al. | |
| 2012/0233694 A1* | 9/2012 | Baliga et al. | 726/23 |
| 2012/0233695 A1 | 9/2012 | Mahaffey et al. | |
| 2012/0240183 A1 | 9/2012 | Sinha | |
| 2012/0246499 A1 | 9/2012 | Jessup et al. | |
| 2012/0254285 A1 | 10/2012 | Tiger et al. | |
| 2012/0259954 A1 | 10/2012 | McCarthy et al. | |
| 2012/0278467 A1 | 11/2012 | Schneider | |
| 2012/0303735 A1 | 11/2012 | Raciborski et al. | |
| 2012/0311659 A1 | 12/2012 | Narain et al. | |
| 2012/0317153 A1 | 12/2012 | Parthasarathy et al. | |
| 2012/0317233 A1 | 12/2012 | Redpath | |
| 2012/0317370 A1 | 12/2012 | Luna | |
| 2012/0324076 A1 | 12/2012 | Zerr et al. | |
| 2012/0324094 A1 | 12/2012 | Wyatt et al. | |
| 2012/0324259 A1 | 12/2012 | Aasheim et al. | |
| 2012/0324568 A1 | 12/2012 | Wyatt et al. | |
| 2013/0013775 A1 | 1/2013 | Baumback et al. | |
| 2013/0019311 A1 | 1/2013 | Swildens et al. | |
| 2013/0023209 A1 | 1/2013 | Fisher et al. | |
| 2013/0041946 A1 | 2/2013 | Joel et al. | |
| 2013/0041974 A1 | 2/2013 | Luna et al. | |
| 2013/0047034 A1 | 2/2013 | Salomon et al. | |
| 2013/0054796 A1 | 2/2013 | Baumback et al. | |
| 2013/0054960 A1 | 2/2013 | Grab et al. | |
| 2013/0055405 A1 | 2/2013 | Zhao et al. | |
| 2013/0067054 A1 | 3/2013 | Pulleyn et al. | |
| 2013/0086682 A1 | 4/2013 | Mahaffey et al. | |
| 2013/0097710 A1 | 4/2013 | Basavapatna et al. | |
| 2013/0111597 A1 | 5/2013 | Gossweiler, III et al. | |
| 2013/0132330 A1 | 5/2013 | Hurwitz et al. | |
| 2013/0132565 A1 | 5/2013 | Cetin et al. | |
| 2013/0159719 A1 | 6/2013 | Ha et al. | |
| 2013/0212684 A1 | 8/2013 | Xuyang Li et al. | |
| 2013/0283377 A1 | 10/2013 | Das et al. | |
| 2013/0298244 A1 | 11/2013 | Kumar et al. | |
| 2013/0303154 A1 | 11/2013 | Gupta et al. | |
| 2013/0326476 A1 | 12/2013 | Wyatt et al. | |
| 2014/0006418 A1 | 1/2014 | Forte et al. | |
| 2014/0041037 A1 | 2/2014 | Ashish Bhatia et al. | |
| 2014/0113588 A1 | 4/2014 | Chekina et al. | |
| 2014/0115659 A1 | 4/2014 | Attfield et al. | |
| 2014/0123289 A1 | 5/2014 | Hsiao et al. | |
| 2014/0150096 A1 | 5/2014 | Moon et al. | |
| 2014/0188886 A1 | 7/2014 | Mahaffey et al. | |
| 2015/0067830 A1 | 3/2015 | Johansson et al. | |
| 2015/0088955 A1 | 3/2015 | Hendrick et al. | |
| 2015/0169877 A1 | 6/2015 | Mahaffey et al. | |
| 2015/0172057 A1 | 6/2015 | Mahaffey et al. | |
| 2015/0172060 A1 | 6/2015 | Mahaffey et al. | |
| 2015/0172146 A1 | 6/2015 | Mahaffey et al. | |

FOREIGN PATENT DOCUMENTS

| | | |
|---|---|---|
| KR | 1020090044656 | 5/2009 |
| KR | 101143999 | 5/2012 |
| WO | 2005101789 | 10/2005 |
| WO | 2006110181 | 10/2006 |
| WO | 2008007111 | 3/2007 |
| WO | 2007081356 | 7/2007 |
| WO | 2008057737 | 5/2008 |
| WO | 2010048218 | 4/2010 |
| WO | 2010048220 | 4/2010 |
| WO | 2012027588 | 1/2012 |

OTHER PUBLICATIONS

Richard Lippmann et al.; The Effect of Identifying Vulnerabilities and Patching Software on the Utility of Network Intrusion Detection; 2002 Springer; pp. 307-326; <http://link.springer.com/chapter/10.1007/3-540-36084-0_17>.*

Ivica Crnkovic et al.; A Classification Framework for Software Component Models; 2011 IEEE; pp. 593-615; <http://ieeexplore.ieee.org/stamp/stamp.jsp?tp=&arnumber=5587419>.* y J. S. Poulin et al.; The business case for software reuse; 1993 IBM; pp. 567-594; <http://ieeexplore.ieee.org/stamp/stamp.jsp?tp=&arnumber=5387336>.*

Wendy Roll; Towards Model-Based and CCM-Based Applications for Real-Time Systems; 2003 IEEE; 8 pages; <http://ieeexplore.ieee.org/stamp/stamp.jsp?tp=&arnumber=1199238>.*

Jan Bosch; Maturity and Evolution in Software Product Lines Approaches, Artefacts and Organization; 2002 Springer; pp. 257-271; <http://link.springer.com/chapter/10.1007/3-540-45652-X_16>.*

International Patent Application PCT/US2013/043569, International Search Report and Written Opinion, Aug. 27, 2013.

"Berry Locator", available at http://www.mobireport.com/apps/bl/, 2007, Mobireport LLC, 1 page.

(56) References Cited

OTHER PUBLICATIONS

"F-Secure Mobile Security for S60 User's Guide," F-Secure Corporation 2009, 34 pages.
"Firefox," Wikipedia, Jul. 20, 2011, available at <http://en.wikipedia.org/wiki/firefox> retrieved Aug. 10, 2011, 37 pages.
"Java Virtual Machine," Wikipedia, Aug. 7, 2011, available at <http://en.wikipedia.org/wiki/Java_Virtual_Machine> retrieved Aug. 10, 2011, 7 pages.
"Kaspersky AV," Kaspersky Lab 1997-2007, 1 page.
"Kaspersky Mobile Security-Anti Theft", Kaspersky Lab 2008, available at http://www.kaspersky.com/kaspersky_mobile_security, 2 Pages.
"Kaspersky Mobile Security-Home Computer Security," Kaspersky Lab 2008, available at <http://www.kaspersky.com/kaspersky₁₃mobile_security>, 1 pages.
"Norton Smartphone Security," Symantec, 2007, available at <http://www.symantec.com/norton/smartphone-security> retrieved Oct. 21, 2008, 2 pages.
"PhoneBak PDA Phone Anti-theft software for your PDA phone", 2007, Bak2u Pte Ltd (Singapore) pp. 1-4.
"PhoneBak: Mobile Phone Theft Recovery Software", 2007, Westin Tech.
"Real world Computing" Jun. 16, 2008 (PC Pro) pp. 1.
"Sprint—Report that your device is lost or stolen", web page downloaded Apr. 11, 2013 from http://support.sprint.com/support/article/Report_that_your_device_is_lost_or_stolen/case-ba416758-20090629-143222.
"Symantec Endpoint Protection," Symantec, 2008, available at <http://www.symantec.com/business/products/family.jsp?familyid=endpointsecurity>, 6 pages.
"Symantec Mobile Security Suite for Windows Mobile," Symantec, 2008, available at <http://www.symantec.com/business/products/sysreq.jsp?pcid=2241&pvid=mobile_security_suite_1>, 5 pages.
"Virgin Media—Phone Lost or Stolen?", web page downloaded Apr. 11, 2013 from http://www.virginmobile.com/vm/ukCoverage.do?contentId=insurance.howdoi.sm283.
Amazon.com: Mining the Web Discovering Knowledge from Hypertext Data (9781558607545): Soumen Chakrabarti: Books, Amazon available at http://www.amazon.com/exec/obidos/ASIN/1558607544/, retrieved on Jun. 7, 2012, published on Dec. 13, 2001, pp. 1-7.
Clickatell, available at http://www.clickatell.com, retrieved Sep. 14, 2011, published on Jan 18, 2011, 11 pages.
Diligent!, M., et al. Focused Crawling Using Context Graphs:, Proceedings of the 26th VLDB Conference, Cairo, Egypt, pp. 1-8, available at www.vldb.org/conf/2000/P257.pdf, retrieved on Oct. 21, 2008, published on Sep. 10, 2000.
Dashwire: Manage Your Cell Phone on the Web, News Blog, with Jessica Dolocourt, Oct. 29, 2007, 5:00am PDT <http://news.cnet.com/8301-10784_3-9805657-7.html> retrieved Jun. 15, 2009; pp. 1-3.
Fette, Ian "Understanding Phishing and Malware Protection in Google Chrome," The Chromium Blog, available at http://blog.chromium.org/2008_11_01_archive.html, retrieved on May 17, 2011, published on Nov. 14, 2008, 6 pages.
Fisher, Oliver, "Malware? We Don't Need No Stinking Malware!", Google, available at http://googlewebmastercentral.blogspot.com/2008/10/malware-we-dont-need-no-stinking.html, retrieved on Mar. 30, 2012, published on Oct. 24, 2008, 11 pages.
Final Office Action dated Feb. 1, 2011 for U.S. Appl. No. 12/255,626, filed Oct. 21, 2008; pp. 1-18.
Google Patent US 20070039053.
Grafio "Stay Secure," Opera Software, Sep. 29, 2008, available at <http://widgets.opera.com/widget/4495> retrieved Oct. 21, 2008, 4 pages.
HTC "Mobile Wipe Smart Phone Management", pp. 1-4, published on Dec. 5, 2007, retrieved on Dec. 5, 2007.
International Search Report for PCT Appln. No. PCT/US2009/061370 dated Dec. 14, 2009.
International Search Report for PCT Appln. No. PCT/US2009/061372 dated Mar. 4, 2010.
Jefferies, Charles P. "Webroot AntiVirus 2010 With Spy Sweeper Review," Notebook Review, available at http://www.notebookreview.com/default.asp?newsID=5700&review=Webroot+AntiVirus+2010+With+Spy+Sweeper+Review, retrieved on May 18, 2011, published on Jun. 22, 2010, 3 pages.
Keane, Justin K. "Using the Google Safe Browsing API from PHP," Mad Irish, Aug. 7, 2009, available at http://www.madirish.net/node/245, retrieved Mar. 30, 2012, published on Aug. 7, 2009, 5 pages.
Kincaid, Jason "Urban Airship Brings Easy Push Notifications to Android," TechCrunch, available at http://techcrunch.com/2010/08/10/urban-airship-brings-easy-push-notifications-to-android/, retrieved on Jun. 16, 2011, published on Aug. 10, 2010, 5 pages.
Mytton, David "How to Build an Apple Push Notification Provider Server (Tutorial)," Server Density, available at http://blog.serverdensity.com/2009/07/10/how-to-build-an-apple-push-notification-provider-server-tutorial/, retrieved on Apr. 2, 2012, published on Jul. 10, 2009, 33 pages.
McAfee, Internet Archive, Way Back Machine, available at <http://web.archive.org/web/20080517102505/www.mcafeesecure.com/us/technology-intro.jsp>, retrieved Feb. 23, 2011,2 pages.
Non-Final Office Action dated Dec. 26, 2012 for U.S. Appl. No. 13/160,382, filed Jun. 14, 2011; pp. 1-23.
Non-Final Office Action dated Mar. 24, 2011 for U.S. Appl. No. 12/255,635, filed Oct. 21, 2008; pp. 1-17.
Non-Final Office Action dated Apr. 13, 2011 for U.S. Appl. No. 12/255,621, filed Oct. 21, 2008; pp. 1-7.
Notice of Allowance dated Nov. 3, 2011 for U.S. Appl. No. 12/255,632, filed Oct. 21, 2008; pp. 1-5.
PCT "International Search Report and Written Opinion of the International Searching Authority for PCT/US2013/027166", mailed on Jun. 19, 2013; received on Jun. 21, 2013.
PCT International Preliminary Report on Patentability for PCT/US2011/049182; Mailed on Mar. 7, 2013; pp. 1-9.
PCT, "International Search Report and Written Opinion of the International Searching Authority for PCT/US2011/049182", mailed on Dec. 23, 2011.
Pogue, David "Simplifying the Lives of Web Users," The New York Times, available at http://www.nytimes.com/2010/08/19/technology/personaltech/19pogue.html, retrieved May 17, 2011, Published on Aug. 18, 2010, 5 pages.
PagerDuty, available at http://www.pagerduty.com, retrieved on Sep. 14, 2011, published on Jun. 6, 2009, 23 pages.
Prey, available at http://preyproject.com/, retrieved Jan. 10, 2012, published on May 16, 2009, 4 pages.
Qualys, "Executive Dashboard," Internet Archive, Way back Machine, available at <http://web.archive.org/web20080507161417/www.qualys.com/products/screens/?screen=Executive+Dashboard>, retrieved Feb. 23, 2011, 1 page.
Qualys, "Vulnerability Management," Internet Archive, Way Back Machine, available at <http://web.archive.org/web/20080611095201/www.qualys.com/solutions/vulnerability_management> Retrieved Feb. 24, 2011, 1 page.
Reardon, Marguerite, "Mobile Phones That Track Your Buddies," Cnet, available at <http://news.cnet.com/Mobile-phones-that-track-your-buddies/2100-1039_3-6135209.html, retrieved Mar. 30, 2012, published on Nov. 14, 2006, 6 pages.
Richardson, Alexis, "Introduction to RabbitMQ", Google UK, available at http://www.rabbitmq.com/resources/google-tech-talk-final/alexis-google-rabbitmq-talk.pdf, retrieved on Mar. 30, 2012, 33 pages, published on Sep. 25, 2008.
Summerson, Cameron "5 Android Antivirus Apps Compared, Find Out Which Ones Are Worth Having!," AndroidHeadlines, available at http://androidheadlines.com/2011/03/5-android-antivirus-apps-comapred-find-out-which-ones-are-worth-having.html, retrieved on Mar. 30, 2012, published on Mar. 8, 2011, 9 pages.
Simone, "Playing with ActiveMQ," Mostly Useless, available at http://www.mostly-useless.com/blog/2007/12/27/playing-with-activemq/, retrieved Mar. 30, 2012, published on Dec. 27, 2007, 6 pages.

(56) References Cited

OTHER PUBLICATIONS

Sprint Nextel, Mobile Locator, Internet Archive, Way Back Machine, available at http://web.archive.org/web/20080901070835/http://www.nextel.com/en/solutions/gps/mobile_locator.html, 2 pages, Retrieved Jan. 16, 2013.

Sprite Mobile, Sprite Backup, Internet Archive, Way Back Machine, available at http://web.archive.org/web/20080901220103/http://www.spritesoftware.com/?page_id=280, 4 pages, Retrieved Jan. 16, 2013.

Tedeschi, Bob, "In Choosing a New Phone, Online Research Goes Only So Far", The New York Times, Oct. 7, 2009; downloaded Jul. 13, 2013 from http://www.nytimes.com/2009/10/08/technology/personaltech/08smat.html?_r=0.

Teh, Joe, "Norton 360 Version 3.0 Review,"Mar. 9, 2009, Available at <http://techielobang-com/blog/2009/03/09/norton-360-version-30-review/> Retrieved Feb. 23, 2011, 12 pages.

Trillian, available at http://www.trillian.im/, retrieved on Sep. 14, 2011, published on Oct. 11, 2007, 24 pages.

U.S. Appl. No. 12/255,635. Prosecution history available via USPTO IFW (including Office Action dated Mar. 24, 2011 and references cited.).

U.S. Appl. No. 12/255,626. Prosecution history available via USPTO IFW (including Office Action dated Feb. 1, 2011 and references cited.).

U.S. Appl. No. 12/255,621. Prosecution history available via USPTO IFW (including Office Action dated Apr. 13, 2011 and references cited.).

U.S. Appl. No. 13/160,447. Prosecution history available via USPTO IFW.

U.S. Appl. No. 12/255,632. Prosecution history available via USPTO IFW (including Notice of Allowance dated Nov. 3, 2011 and references cited).

U.S. Appl. No. 12/255,614; Prosecution history available via USPTO IFW (including OA dated Apr. 14, 2011).

Virus Total, VT Community, www.virustotal.com/index.html; Dated Dec. 16, 2011; 44 Pages.

Windows Update, Internet Archive, Way Back Machine, available at <http://web.archive.org/web/20071022193017/http://en.wikipedia.org/wiki/Windows_Update> Retrieved Feb. 23, 2011, 3 pages.

"Android Cloud to Device Messaging Framework," Google Code Labs, available at http://code.google.com/android/c2dm/, retrieved on Sep. 14, 2011, published on Apr. 11, 2011, 9 pages.

"BlackBerry Push Service Overview," available at http://us.blackberry.com/developers/platform/pushapi.jsp#tab_tab_resources, retrieved on Sep. 14, 2011, published on Nov. 6, 2010, 21 pages.

"Get the Physical Location of Wireless Router From its MAC Address (BSSID)," Coderrr, available at http://coderrr.wordpress.com/2008/09/10/get-the-physical-location-of-wireless-router-from-its-mac-address-bssid/, retrieved on Mar. 30, 2012, published on Sep. 12, 2008, 13 pages.

"Hooking—Wikipedia, the Free Encyclopedia," Wikipedia, available at http://web.archive.org/web/20100415154752/http://en.wikipedia.org/wiki/Hooking, retrieved Mar. 30, 2012, published on Apr. 15, 2010, 6 pages.

"Pidgin the Universal Chat Client," Pidign, available at http://www.pidgin.im/, retrieved Sep. 14, 2011, published on May 1, 2007, 14 pages.

"Twilio Cloud Communications Web Service API for Building Voice and SMS Applications," Twilio, available at http://www.twilio.com, retrieved Sep. 14, 2011, published on Jun. 5, 2008, 12 pages.

"Understanding Direct Push," Microsoft, Feb. 18, 2009, available at http://technet.microsoft.com/en-us/library/aa997252(v=exchg.80).aspx, retrieved on Mar. 30, 2012, published on Feb. 18, 2009, 3 pages.

"Urban Airship: Powering Modern Mobile," available at http://urbanairship.com/products/, retrieved on Sep. 16, 2011, published on Feb. 19, 2010, 14 pages.

"eSoft unveils SiteFilter 3.0 for OEMs," Infosecurity, Mar. 23, 2010, available at http://www.infosecurity-magazine.com/view/8273/esoft-unveils-sitefilter-30-for-oems/, retrieved on Mar. 30, 2012, published on Mar. 23, 2010, 2 pages.

"zVeloDB URL Database," zVelo, available at https://zvelo.com/technology/zvelodb-url-database, retrieved Mar. 30, 2012, published on Jan. 21, 2012, 2 pages.

McAfee Knowledge Base Corporate KB60224, last modified on Jan. 19, 2010.

McAfee Technical Brief zero day to real time, 2008.

McAfee Artemis Technology—Always-On, Real-Time Protection, 2008.

Norton Insight A solution to Performance, published on Aug. 29, 2008.

TippingPoint "TippingPoint Security Management System (SMS)", published on Mar. 31, 2005, 2 pages.

TrendMicro SmartPhone Protection Network, dated Jun. 2008.

COMODO Group, Inc. website history page using wayback machine, "Digital Code Signing, Code Signing Certificates—COMODO", May 11, 2013, p. 1-6.

Fleurey et al., "A Domain Specific Modeling Language Supporting Specification, Simulation and Execution of Dynamic Adaptive Systems", MODELS 2009, LNCS 5795, pp. 606-621, 2009, Springer-Verlag Berlin Heidelberg.

Hervas et al., "Towards the ubiquitous visualization: Adaptive user-interfaces based on the Semantic Web", Interacting with Computers 23, pp. 40-56, 2011, Elsevier B.V.

\* cited by examiner

EXPRESSING INTENT TO CONTROL BEHAVIOR OF APPLICATION COMPONENTS

CROSS-REFERENCE TO RELATED APPLICATIONS

The present application is a continuation of U.S. Non-Provisional application Ser. No. 13/692,806, filed Dec. 3, 2012, entitled "COMPONENT ANALYSIS OF SOFTWARE APPLICATIONS ON COMPUTING DEVICES," by Wyatt et al., which itself claims priority to U.S. Provisional Application Ser. No. 61/655,822, filed Jun. 5, 2012, entitled "EXPRESSING INTENT TO CONTROL BEHAVIOR OF APPLICATION COMPONENTS," by Halliday et al., the entire contents of which applications are hereby incorporated by reference as if fully set forth herein.

FIELD OF THE TECHNOLOGY

At least some embodiments disclosed herein relate to analysis of software components in general, and more particularly, but not limited to, identifying software components corresponding to one or more behaviors or other characteristics exhibited by an application on a computing device. Other embodiments disclosed herein relate to control of behavior on computing devices in general, and more particularly, but not limited to, receiving or determining a user's intent regarding control of behavior of one or more application components installed on a computing device, or regarding an evaluation/assessment of behavior for components yet to be installed on a computing device.

BACKGROUND

One common type of computing device is a mobile device such as an iPhone device. Mobile devices have evolved beyond simple telephone functionality and are now more complex multi-functional devices. In addition to voice communications, many mobile devices are capable of text messaging, email communications, Internet access, and the ability to run full-featured application software. For example, mobile devices can use these capabilities to perform online transactions. Furthermore, mobile devices used by an individual or a business often store information in many forms such as electronic documents, text messages, etc. Applications that run on the mobile device may, for example, be downloaded and installed from an application marketplace.

An example of an application marketplace is the Google Play service. Google Play is a service that includes an online store for music, movies, books, and Android applications ("apps"). The service is accessible from the web, and from the Play Store Mobile App on Android. Google Play was introduced in March 2012 when Google re-branded and merged its predecessor Android Market and Google Music services. Some of the applications that may be downloaded incorporate so-called advertising networks.

An online advertising network, or simply ad network, is operated by a company that connects advertisers to web sites that want to host advertisements. A key function of an ad network is aggregation of ad space supply from publishers and matching of this supply with advertiser demand. An ad network typically uses a central ad server to deliver advertisements to consumers (e.g., via their mobile devices), which enables targeting, tracking and reporting of advertisement impressions in ways not possible with traditional analog media alternatives.

There are an increasing number of ad networks appearing on mobile devices. Any given application installed on a mobile or other computing device may be associated with one or more ad networks, and this association is not always obvious to the user. As an example of a downloaded application incorporating advertisements, a user may download a free poker game or a chess game from an application marketplace. In order to provide the game free of charge, the game owner incorporates the display of ads from an ad network during game play.

Ad networks collect a variety of data, sometimes including personally identifying information (PII) and device-specific information. They collect this data in order to provide targeted advertisements, which are in turn more profitable.

Some ad networks go beyond the in-application ad delivery experience and put advertisements into, for example, the notification bar of the mobile device. Sometimes it is difficult for a user to determine what is happening on his or her phone, in particular when messages or other items appear on parts of the user's phone that are not specifically related to any one given application.

SUMMARY OF THE DESCRIPTION

Systems and methods for analysis of software components (e.g., components for an Android, iOS, Windows Phone, or other platform application that is newly-installed or being considered for installation on a user mobile device) are described herein. Some embodiments are summarized below.

In one embodiment, a method includes: for an application installed on a computing device of a user, determining components of the application; and identifying, via at least one processor, at least one behavior associated with each of the components, including a first behavior associated with a first component.

In one embodiment, a system includes: a data repository storing component data for known components, the component data including data for a first known component; at least one processor; and memory storing instructions, which when executed on a computing apparatus, cause the computing apparatus to: for a new component in a first application for a computing device of a user, perform a comparison of the new component to the component data; and based on the comparison, make a determination that the new component corresponds to the first known component.

In one embodiment, a method includes: storing, in memory, component data for known components, the component data including data for a first known component; for a new component in a first application for a computing device of a user, perform, via at least one processor, a comparison of the new component to the component data; and based on the comparison, make a determination that the new component corresponds to the first known component.

Systems and methods for control of behavior on computing devices are also described herein. Some embodiments are summarized below.

In one embodiment, a method includes, for an application installed on a computing device of a user, determining components of the application; identifying at least one behavior associated with each of the components, including a first behavior associated with a first component; presenting results from the identifying to the user, the results to include a list of behaviors including the first behavior; and receiving a selection from the user of at least one behavioral preference.

In another embodiment, a method includes, for an application installed on a computing device of a user, determining components of the application; identifying at least one behavior associated with each of the components, including a first behavior associated with a first component; and determining at least one behavioral preference of the user.

The disclosure includes methods and apparatuses which perform the above methods and systems, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
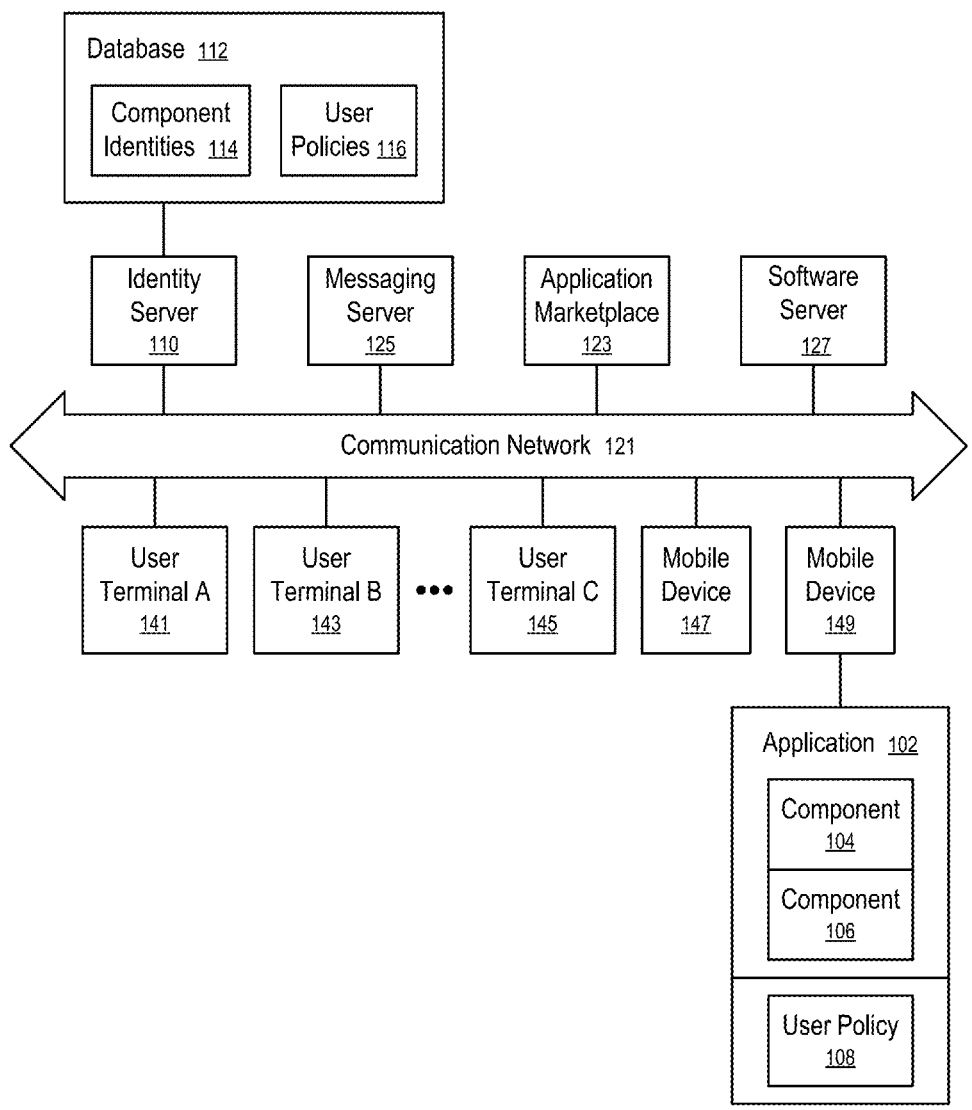
FIG. 1 shows a system (for control of behavior on computing devices or for analysis of software components) in which user terminals and mobile devices communicate with a messaging server and/or an application marketplace, or with an identity server, according to various embodiments.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, a "component" means a part of an application (e.g., an application that is installed by a user from an Android or other software application marketplace and then executes on a mobile device). In one example, a component is provided by the application's creator or by a third party. In another example, the component may be code provided by an ad network or an analytics network.

In yet another example, components are linked libraries/SDKs that are packaged within an application. This is code that is within the application, but the code is developed by a third party and provides the ability for an application developer to integrate certain behaviors of that component into its application (e.g., displaying a certain type of ads from a certain ad network such as LeadBolt).

In one embodiment, a component (e.g., a component associated with an ad network) may have multiple behaviors associated with it (e.g., notification display, settings changes, and/or information collection). For example, the behaviors of the BTController application (discussed further below) is the summation of the behaviors of its constituent components. In some cases, components may provide the ability to selectively opt-out of individual behaviors. However, in other cases, this is not possible, and in order to opt out of any set of behaviors, a user must opt-out of the entire component.

As described in more detail below, a user may express its intent as to how the user desires its computing device to behave. The intent may be explicitly provided by the user or may be otherwise determined (e.g., by reference to a database on a remote server). In one embodiment, the user's intent defines how the user wants to control receiving of certain types of messages (e.g., advertisements). The type of control desired by the user in its various forms of experience on a computing device (e.g., a mobile device) is expressed in the user's intent. This intent may be used to determine various behaviors of the computing device. For example, some undesired behaviors may be stopped by disabling various components of one or more applications that have been previously installed on the user's mobile device.

FIG. 1 shows a system (for control of behavior on computing devices or for analysis of software components, each as described herein) in which user terminals and mobile devices (examples of mobile devices include cell phones, smartphones, and tablet devices such as the iPhone device or an Android tablet), or other computing devices, communicate with a messaging server 125 and/or an application marketplace 123, or with an identity server 110, according to various embodiments as described below. In FIG. 1, the user terminals (e.g., 141, 143, . . . , 145) and/or mobile devices 147, 149 are used to access and/or communicate with identity server 110, application marketplace 123 (e.g., an Android or Google Play marketplace), and/or messaging server 125 (e.g., an email server) over a communication network 121 (e.g., the Internet, a wide area network, or other wired or wireless communications network).

Network 121 may be used to download and remotely install applications selected from marketplace 123 (e.g., using Google Play or the Android Market). Marketplace 123 may include one or more web servers (or other types of data communication servers) to communicate with the user terminals (e.g., 141, 143, . . . , 145) and mobile devices 147, 149.

As an example, an owner of an Android phone (e.g., mobile device 147) may visit a web site hosted by marketplace 123 and select a free poker game application for remote installation on mobile device 147. The user may authenticate itself to marketplace 123 by its email address (e.g., Gmail address) and password.

The marketplace 123 and/or messaging server 125 are connected to respective data storage facilities to store applications, messaging account data for users, user preference data, and other data. In FIG. 1, messaging server 125 is connected to communication network 121 to deliver messages (e.g., email or text) to user terminals 141-145 or one of a user's mobile devices 147, 149.

In one embodiment, a software server 127 is coupled to communicate with application marketplace 123 and/or mobile devices 147, 149 by communication network 121. Server 127 stores, for example, an application (e.g., the Ad Network Detector discussed below) in memory, and sends the application to application marketplace 123 for later download and installation by a user onto, for example, mobile device 147. In another embodiment, software server 127 is a developer computer, or another computer, used to upload an application to marketplace 123.

In one embodiment, server 127 communicates with the application (now executing on mobile device 147 after installation by the user). The application is configured to identify at least one behavior on mobile device 147 as discussed herein. The at least one behavior is associated with each of a plurality of components of a plurality of other applications installed on the mobile device 147 (e.g., other applications previously downloaded by the user from the Google Play service), and the at least one behavior includes a first behavior associated with a first component.

Server 127 receives at least one behavioral preference of the user from mobile device 147, and the at least one behavioral preference is determined by the application based on input from the user (e.g., a user selection from a menu or results list). Server 127 stores the at least one behavioral preference (e.g., stores in a memory of server 127) for later uses such as responding to queries from other computing devices regarding the intent of the user of mobile device 147. In one embodiment, server 127 is independently maintained by each of many ad networks. The Ad Network Detector discussed herein may manage these behavioral preferences on behalf of a user for these networks.

In an alternative embodiment, identity server 110 includes a database 112, which stores component identities 114 and user policies 116. Mobile device 149 includes applications 102 that have been previously installed on mobile device 149. Applications 102 may be installed from application marketplace 123 or software server 127.

Applications 102 include components 104 and 106. The user policy 108 is stored locally in a memory of mobile device 149. During operation, as discussed in more detail below, user policy 108 may be used to define the handling of components 104 and 106 on mobile device 149.

A user policy for mobile device 149 may alternatively (or in addition to user policy 108) be stored as one of user policies 116 on identity server 110. User policy may be enforced on mobile device 149 using either a local user policy or a remote user policy, or a combination thereof.

As discussed in more detail below, after an application 102 is installed on mobile device 149, components 104 and 106 may be identified and behaviors exhibited on mobile device 149 may be attributed to one or more of components 104 and 106. Any given component (e.g., component 104) may be present in several different applications on mobile device 149 and/or may be common to numerous copies or versions of an application that have been installed on mobile or other computing devices for large numbers of other users. In one embodiment, this commonality of component presence permits observing and collecting structural and behavioral data associated with the component (e.g., how the component behaves on other mobile devices). This known component data may be stored in database 112, and the component data may be associated with a particular component identity 114. Thus, a data repository of prior component data can be used to compare to data more recently obtained for new components (such as those identified in newly-installed applications on mobile device 149).

More specifically, as characteristics and behaviors associated with components on mobile device 149 are identified and attributed, these characteristics and behaviors may be compared with known characteristics and behaviors stored either locally on mobile device 149 or stored remotely on identity server 110 as data associated with component identities 114. The results from such comparisons may be used for making decisions regarding configuration and/or disabling of one or more particular components on the mobile device or other computing device (e.g. user terminal 141), as discussed in greater detail below.

Although FIG. 1 illustrates an exemplary system implemented in client-server architecture, embodiments of the disclosure can be implemented in various alternative architectures. For example, the identity server 110 or application marketplace 123 may be implemented via a peer to peer network of user terminals in some embodiments, where applications and data/information from mobile devices are shared via peer to peer communication connections.

In some embodiments, a combination of client server architecture and peer to peer architecture can be used, in which one or more centralized server may be used to provide some of the information and/or services and the peer to peer network is used to provide other information and/or services. Thus, embodiments of the disclosure are not limited to a particular architecture.

Figure 2:
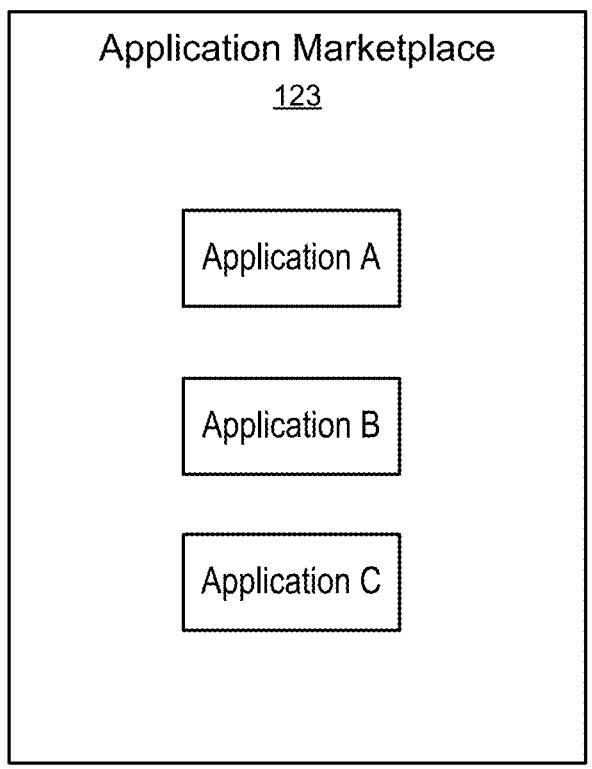
FIG. 2 shows an application marketplace offering multiple applications for remote installation on mobile devices, according to one embodiment.

FIG. 2 shows a web page of application marketplace 123 (e.g., the Google Play service) offering multiple applications (A, B, C) for remote installation on mobile devices, according to one embodiment. A user accesses the web page and selects an application for remote installation. The user may pay for the application on a web page provided by marketplace 123 (unless the application is free of charge).

For example, one of the applications available for download may be the application known as "BTController" as available on the Google Play service. Some user reviews (as posted on Google Play) for this application have included complaints about excessive advertisements on the user's mobile device after installation.

In one embodiment, an application referred to herein as "Ad Network Detector" may be downloaded from the Google Play service onto a user's mobile device 147. The expressing of user intent and control of behavior for mobile device 147 as described below may be incorporated into or otherwise work in conjunction with the Ad Network Detector application.

The Ad Network Detector application scans a user's phone or tablet for the presence of ad networks used in mobile apps, giving the user information about what types of ads can be displayed, and what information is gathered by the ad networks. With access to this information, the user is able to decide whether to keep the application that has a particular ad network on the user's phone.

Mobile device (e.g., smartphone or tablet) usage has increased dramatically, and some advertisers have begun to experiment with aggressive, new techniques to display ads on mobile devices. These techniques include pushing ads to the standard Android notification bar, dropping generically designed icons on the mobile desktop, and modifying browser settings like bookmarks or the default homepage. Because each of these techniques can display an advertisement outside the context of a specific application, it's difficult for users to know exactly which app is responsible for any given ad. The Ad Network Detector application provides a method for users to determine which ad network and application are the source for such ads.

Some ad networks also collect information that identifies a specific device or user for use in targeted marketing campaigns. Much like for browser-based ads, this practice allows users to see more personalized or relevant ads. It is sometimes difficult for a user to know what aspects of the user's information are collected by ad networks. The capabilities and information collection methods specific to each ad network may be determined from investigation. The Ad Network Detector application informs the user what data is being collected, and by which ad network/application.

In this embodiment, the Ad Network Detector application provides information to the user to about practices supporting mobile advertising. The application may detect many ad networks. Some of the ad networks detected may include the following examples:

Lead Bolt
AdFonic
AdKnowledge
AdMob
BuzzCity
Casee
Everbadge
JumpTap

Regarding ad network capabilities and privacy, in this embodiment the capabilities and information collection methods specific to each ad network may be investigated. Based on this investigation, the Ad Network Detector application details what identifying information is collected by each ad network, and how it is collected. This may include personal information directly linkable to an individual user, such as an email address, and device and network information that is specific to an individual device or network, rather than to the user.

Figure 3:
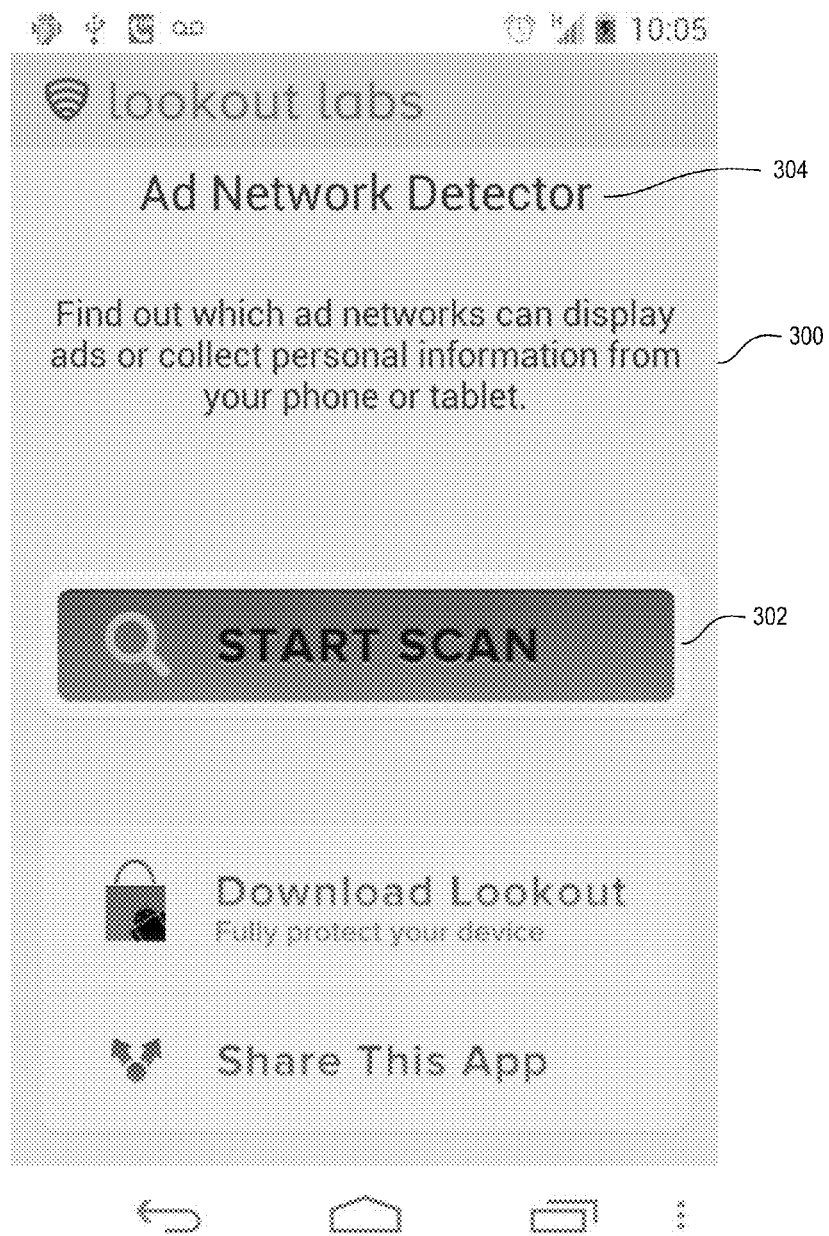
FIG. 3 shows a screen presented by an installed application to a user on a display of a mobile device, according to one embodiment.

FIG. 3 shows a screen 300 presented by an installed application 304 (e.g. the Ad Network Detector application after installation from application marketplace 123) to a user on a display of mobile device 147, according to one embodiment. In this embodiment, a user expresses his or her intent to control behavior of application components on mobile device 147.

In one example, a BTController application has previously been installed on the mobile device 147 by the user, among numerous other user-installed applications. The BTController includes an advertisement network component having several behaviors. A first behavior is the display of advertisements in the notification bar of mobile device 147.

In this embodiment, the components of each application (e.g., BTController) previously installed on mobile device 147 are determined (e.g., determined by application 304 or another tool installed on the mobile device for that purpose). For example, a scan to determine these components may be initiated by the user by her clicking on or touching a start scan button 302.

An example of a component to be identified is the Lead Bolt advertising network included in the BTController application. In addition, at least one behavior (e.g., displaying of ads in the notification bar) associated with each of the components for an installed application is identified.

The identified behaviors are presented to the user (e.g., in a list of scan results). At least one behavioral preference expressing the intent of the user is determined (e.g., a desire of the user to opt out of a particular behavior). This intent is then implemented on the mobile device by reconfiguring the identified components of various applications on the mobile device as necessary to conform to the user's expressed intent.

Figure 4:
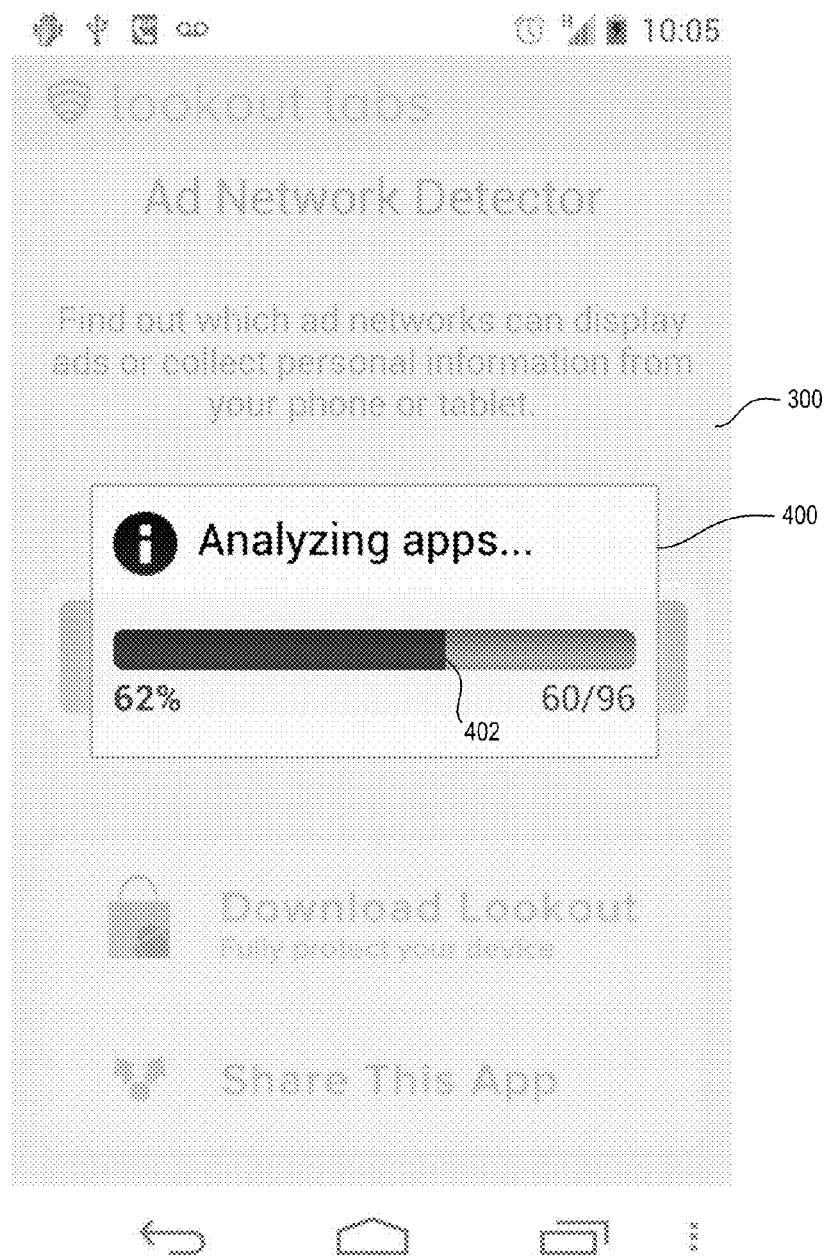
FIG. 4 shows a status display presented by the installed application of FIG. 3 that indicates the status of analyzing applications on the mobile device, according to one embodiment.

FIG. 4 shows a status display 400 presented to the user by the installed application 304 that indicates the status of analyzing applications on the mobile device 147 (i.e., applications other than application 304 that are installed on the mobile device) to identify their respective components, according to one embodiment. An extent of progress of the analysis or scan is indicated by bar 402.

Figure 5:
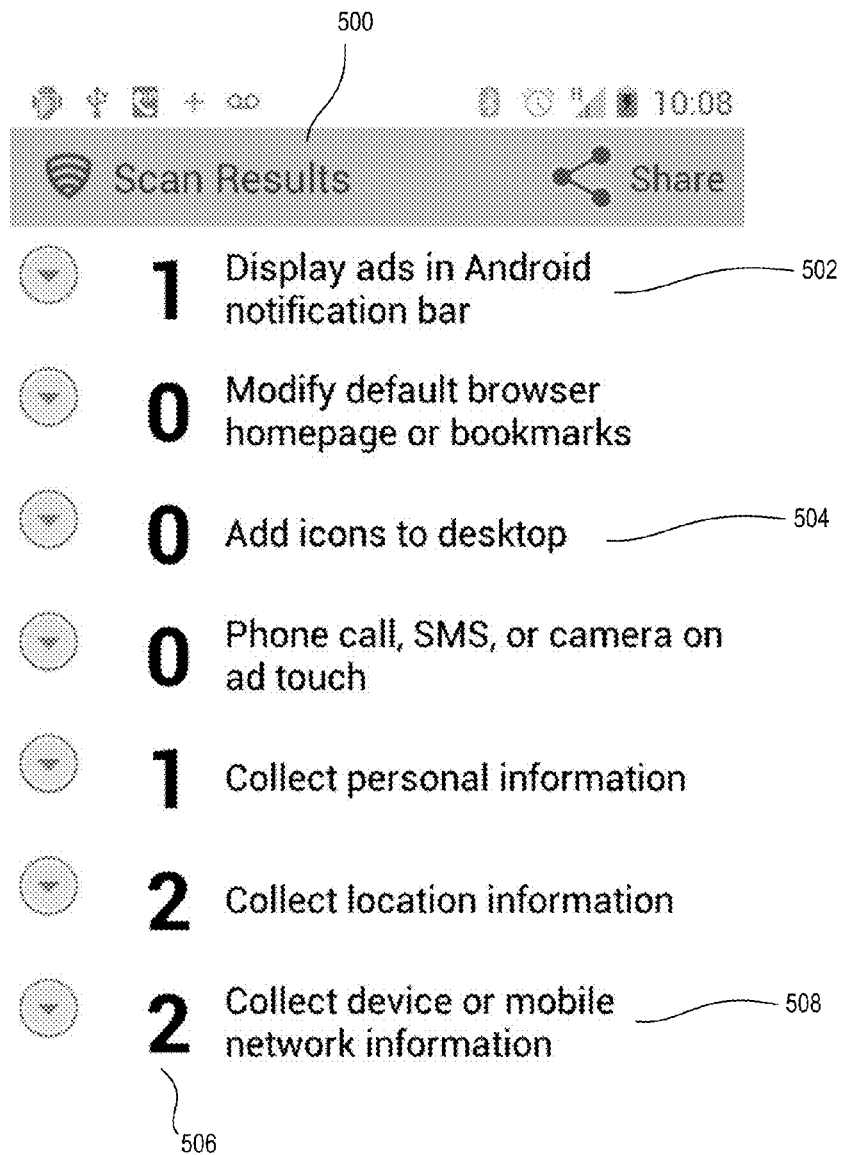
FIG. 5 shows a set of results presented to the user from the analyzing of the applications on the mobile device, according to one embodiment.

FIG. 5 shows a set of results 500 presented to the user from the analyzing of the applications on the mobile device 147, according to one embodiment. The results include a list of behaviors identified. For example, behavior 502 is the display of ads in the notification bar of the mobile device. The number of applications identified that include a component exhibiting the listed behavior is indicated in vertical arrangement or column 506. For example, only one application was identified that includes a component exhibiting behavior 502. Two applications were identified that include a component exhibiting behavior 508. In contrast, zero applications were identified including a component that exhibits behavior 504. It should be noted that the count, in this implementation, refers to the number of components that exhibit a particular behavior. This count (or an additional count) in other implementations could reflect the number of applications that exhibit the behavior. Any given component may be present in several different applications, so these two counts are not necessarily equal.

Figure 6:
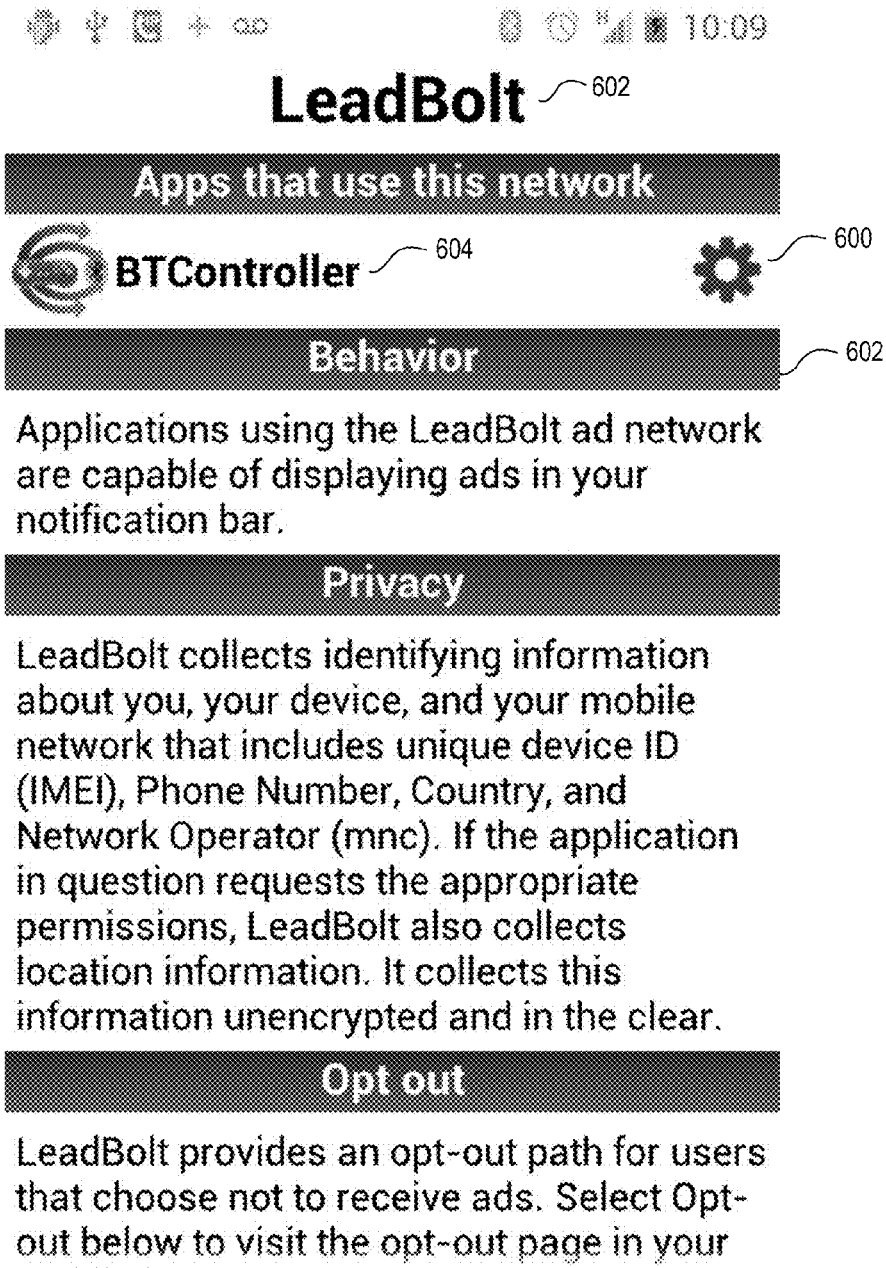
FIG. 6 shows a screen presenting information about an advertisement network incorporated in an application installed on the mobile device, according to one embodiment.

FIG. 6 shows a screen 600 presenting information about an advertisement network 602 (LeadBolt) incorporated in an application 604 (BTController) installed on mobile device 147, according to one embodiment. Screen 600 includes a description 606 of the behavior associated with application 604.

Figure 7:
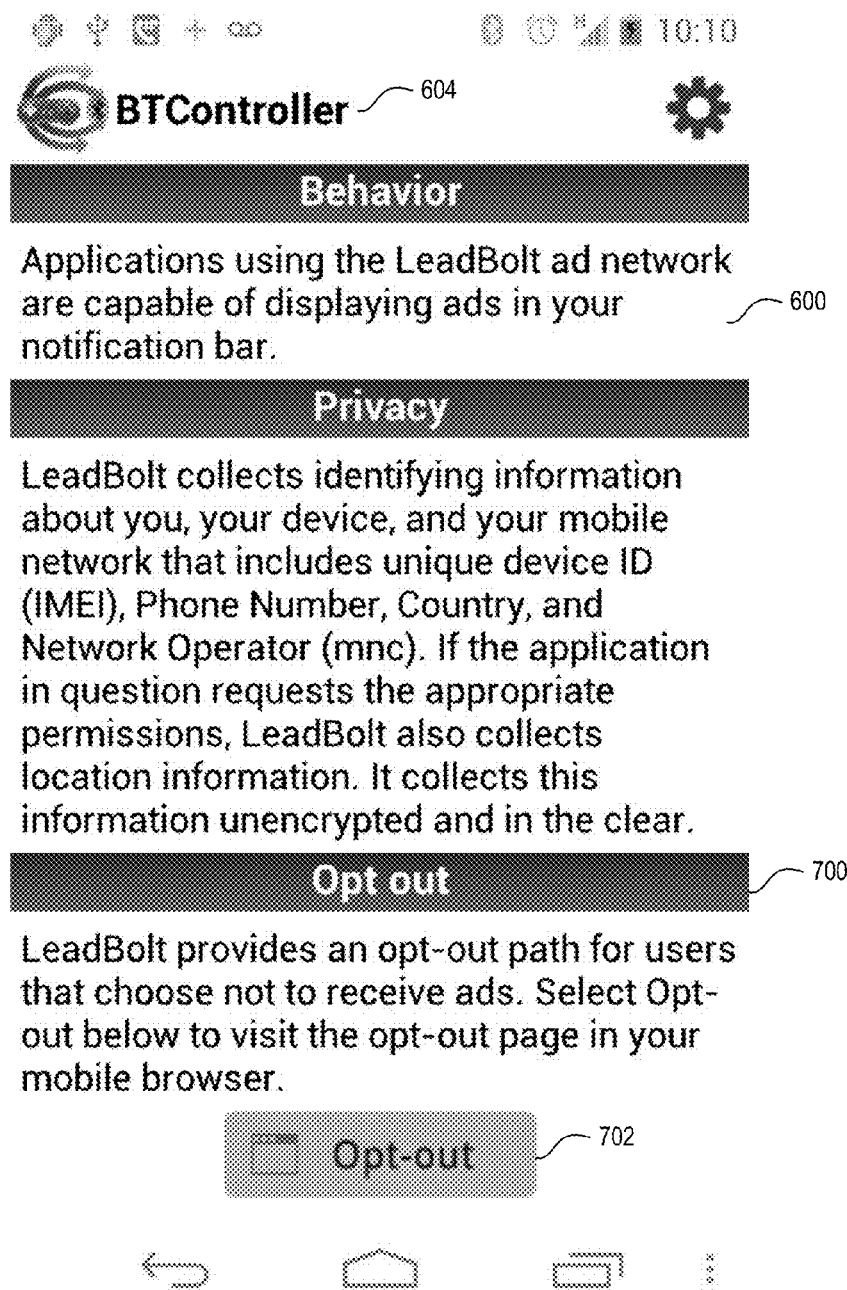
FIG. 7 shows a screen presenting an opt-out button for the user to opt out of the advertisement network, according to one embodiment.

FIG. 7 shows screen 600 presenting an opt-out button 702 for the user to opt out of advertisement network 602, according to one embodiment. Screen 600 includes a description 700 describing an opt-out option for advertisement network 602. The user expresses her intent by clicking on or touching (e.g., on a touch screen) opt-out button 702.

In one embodiment, the user's intent may be stored locally in a memory of mobile device 147. Alternatively, this intent may be stored remotely on a different computing device such as a server (e.g., software server 127 of FIG. 1, which may be a server operated by the software developer of the Ad Network Detector discussed above) accessible via communication network 121. This server may also be accessible by third-party application developers in order to conform behaviors to intents previously expressed by respective users. In another embodiment, this server is operated by the owner of the component.

Various other embodiments are now described below. In a first embodiment, a computer-readable storage medium stores computer-readable instructions (e.g., instructions of an Ad Network Detector), which when executed, cause a computing apparatus (e.g., a mobile device of a user) to, for an application installed on the mobile device of the user, determine components of the application; identify, via at least one processor of the mobile device, at least one behavior associated with each of the components, including a first behavior (e.g., ad display in a notification bar) associated with a first component; present results from the identifying to the user, the results to include a list of behaviors including the first behavior; and receive a selection from the user of at least one behavioral preference. Further information regarding determining the components of an application is discussed in greater detail below in the section titled "Analyzing Components of an Application".

In one embodiment, the at least one behavioral preference is selected from the group consisting of: opting out of the first behavior; opting out of one or more of the components including the first component; a set of user preferences for specifically-identified behaviors; and a policy. In one embodiment, the at least one behavioral preference is a policy, and the policy is enforced on new applications installed on the mobile device. In one embodiment, the first component enables the user to selectively opt out of individual behaviors of the first component.

In one embodiment, the selection from the user of at least one behavioral preference is to opt out of the first behavior, and the instructions further cause, after the opting out, running the first component to determine whether the first behavior is active. In one embodiment, the determining whether the first behavior is active comprises at least one activity selected from the group consisting of: running the first component in an emulated environment on a different computing device (e.g., software server 127); and monitoring behavior on the mobile device after receiving the selection from the user.

In one embodiment, the selection from the user of at least one behavioral preference is to opt out of the first behavior, and the instructions further cause, after the opting out, determining a status of the opting out using an application programming interface of the first component. In one embodiment, the instructions further cause the mobile device to, in response to the selection from the user, reconfigure execution of the first component so that the first behavior no longer occurs on the mobile device.

In one embodiment, the instructions further cause, in response to the selection from the user, uninstalling the application from the mobile computing device. In one embodiment, the instructions further cause, in response to the selection from the user, disabling further execution of the first component on the mobile device. In one embodiment, the first component is shared by the application and an additional application, and the disabling affects both the application and the additional application.

In one embodiment, the first behavior is a presentation of messages to the user. In one embodiment, the messages include at least one advertisement presented in a notification area of the mobile device. In one embodiment, the presentation of messages is outside of a context of the application presented to the user during normal operation of the application. In one embodiment, the first component is a part of the application.

In one embodiment, the instructions further cause displaying opt-out options to the user, wherein the opt-out options are solely for applications already installed on the mobile device. In one embodiment, the instructions further cause displaying opt-out options to the user, the opt-out options comprising all possible opt-out flows for the user on the mobile device as determined from a database. In one embodiment, the first component is a linked library packaged with the application prior to installation of the application on the mobile device.

In one embodiment, the mobile device is a tablet device. In one embodiment, the first component is a portion of the executable code of the application, and the executable code enables the application to interact with an advertising network or an analytics network. In one embodiment, interaction with the advertising network comprises display of advertisements provided from the advertising network.

In one embodiment, a non-transitory computer-readable storage medium stores computer-readable instructions, which when executed, cause a computing apparatus to: for an application installed on a computing device of a user, determine components of the application; identify, via at least one processor, at least one behavior associated with each of the components, including a first behavior associated with a first component; and determine at least one behavioral preference of the user.

In one embodiment, the instructions further cause storing the at least one behavioral preference on the computing device so that the application can locally determine the at least one behavioral preference. In one embodiment, the instructions further cause the first component to evaluate the at least on behavioral preference to determine how the first component is to behave on the computing device.

In one embodiment, the instructions further cause storing the at least one behavioral preference on a different computing device so that an advertisement network associated with the first component can query the different computing device (e.g., software server 127) in order to determine the at least one behavioral preference of the user. In one embodiment, the instructions further cause the first component to execute in conformance with results from the query of the different computing device, wherein the query includes a user identifier of the user.

In one embodiment, the instructions further cause: in response to downloading or installing the application, scanning the application to confirm compliance with the at least one behavioral preference of the user; and if the application violates the at least one behavioral preference, alerting the user of the violation or blocking installation of the application.

In one embodiment, a system comprises: a display; at least one processor; and memory storing instructions configured to instruct the at least one processor to: determine components of an installed application; identify at least one behavior associated with each of the components, including a first behavior associated with a first component; present, on the display, at least one component of the installed application for which a user can opt out; and receive a selection from the user of an opt-out for a first component of the at least one component.

In one embodiment, the instructions are further configured to instruct the at least one processor to present an opt-out status to the user for components for which the user has previously opted out.

In one embodiment, a method includes: for an application installed on a computing device of a user, determining components of the application; identifying, via at least one processor of the computing device, at least one behavior associated with each of the components, including a first behavior associated with a first component; presenting, on a display of the computing device, results from the identifying to the user, the results to include a list of behaviors including the first behavior; and receiving, via a user interface of the computing device, a selection from the user of at least one behavioral preference.

In one embodiment, a method includes: storing, in a memory (e.g., a memory of software server 127), a first application (e.g., the Ad Network Detector application) comprising computer-readable instructions, which when executed, cause a mobile device of a user to: determine components of a second application (e.g., BTController application 604) installed on the mobile device; identify at least one behavior associated with each of the components, including a first behavior associated with a first component (e.g., Lead Bolt component 602); and determine at least one behavioral preference of the user; and sending, via at least one processor (e.g., microprocessor(s) of software server 127), over a communication network, the first application for storage in a data processing system (e.g., application marketplace 123) for subsequent installation from the data processing system onto the mobile device.

In one embodiment, the method further comprises communicating, via the at least one processor, with the first application after installation of the first application on the mobile device. In one embodiment, the data processing system comprises an application marketplace. In one embodiment, a network operator (e.g., Verizon or AT&T) controls the data processing system, and the mobile device is configured to operate with a cellular network operated by the network operator.

In one embodiment, a system (e.g., software server 127) comprises: at least one processor; and memory storing a first application, which when executed on a mobile device of a user, causes the mobile device to: determine components of a second application installed on the mobile device; identify at least one behavior associated with each of the components, including a first behavior associated with a first component; and determine at least one behavioral preference of the user; and the memory further storing instructions configured to instruct the at least one processor to send the first application to a data processing system (e.g., application marketplace 123) so that the first application can be later installed, over a communication network, on the mobile device from the data processing system.

In one embodiment, the instructions are further configured to instruct the at least one processor to communicate with the first application after installation of the first application on the mobile device.

In one embodiment, a method includes: communicating, via at least one processor (e.g., a processor of software server 127), with an application (e.g., the Ad Network Detector application) executing on a mobile device of a user, the application identifying at least one behavior on the mobile device, the at least one behavior associated with each of a plurality of components of a plurality of other applications installed on the mobile device, and the at least one behavior including a first behavior associated with a first component; receiving at least one behavioral preference of the user from the mobile device, the at least one behavioral preference determined by the application based on input from the user; and storing, in a memory (e.g., storing in a database distributed among multiple database servers), the at least one behavioral preference.

In one embodiment, the method further comprises storing the at least one behavior. In one embodiment, the method further comprises receiving a query from an advertisement network, associated with the first component, the query requesting the at least one behavioral preference of the user. In one embodiment, the method further comprises receiving, from the mobile device, an identification of the first component; and running, via the at least one processor, the first component in an emulated environment to determine whether the first behavior is active.

In one embodiment, the method further comprises receiving a query regarding the at least one behavioral preference in order to determine conformance of a new application with the at least one behavioral preference. In one embodiment, the method further comprises providing information in response to a request, received over a communication network, in order to evaluate the at least one behavioral preference and determine how the first component is to behave on the mobile device.

Additional exemplary, non-limiting details regarding various implementations of the above embodiments are now described here below. In one example, a user may opt-out of specific components (e.g., as determined using the approaches described herein). The user is presented a list of components that the user can opt out of. The user may perform opt-out actions, or these may be done automatically upon user request or selection. Then, the user may see (e.g., on a display of a mobile device) a status indication that the user has opted out of identified components.

In one embodiment, there are various types of opt-out options. For example, a user may opt-out entirely of a component, opt-out of particular behaviors of a component, opt-in entirely to a component, opt-in to particular behaviors of a component, purge some or all data collected by a component, reset an identifier used to identify the user or device to a component, or otherwise modify the component's behavior on the device or the data transferred to or from the component on the device.

In one embodiment, opt-out options may be displayed to a user (e.g., on a display of a mobile device) using various approaches. In a first approach, this is done by detecting which components are present in installed applications on a mobile device, and then only displaying opt-out flows for the applications are installed on the mobile device. In a second approach, input is received from a user as to which behaviors the user wishes to opt out of. In a third approach, all possible opt-out flows, as determined from a database, are presented to the user.

In one embodiment, a status for opt-out may be determined in various ways. A first way uses an API provided by the vendor or developer of the component to determine the opt-out status. A second way determines whether behavior is still active by running the corresponding component (e.g., in an emulated environment on a server or by monitoring behavior on the user's mobile device).

In one embodiment, a user declares preferences for specific behaviors desired on the user's mobile device. The components themselves evaluate these declared preferences in order to determine how the components should behave on the user's mobile device.

For example, the user may set its preferences, and then these preferences are stored locally or on a remote server (e.g., software server 127). A component queries these preferences (e.g., by sending a query) in order to determine how the component should behave (or is required to behave by the mobile device or another computing device).

In one embodiment, various types of preferences that can be set by the user relate to the following: location collection for targeted ads, notifications in a notification area of the user's device, planting of bookmarks or icons on a device, and app tracking used to deliver targeted ads (e.g., related to determining what apps a user has installed).

In one embodiment, various methods may be used for storing the users preferences. In a first approach, local service on a device is used, whereby applications can query to determine what preferences a user has set.

In a second approach, a server-side service permits ad networks to query a user's preferences based on a user identifier (e.g., phone number, IMEI, Android ID, Apple UDID, or hashed/salted-hashed versions of them).

In another embodiment, preferences are declared for which behaviors a user desires. Automatic scanning or alerting is performed when an application that violates these preferences is downloaded or installed.

For example, upon installation, the mobile device detects which components are in an application, and determines the behaviors that are associated with components of the application. If any of these behaviors are disallowed, or require an alert, the mobile device may either block the application from installing (or notify the user to uninstall the application), or may alert the user that the application contains a disallowed behavior in one of its components.

Now discussing additional non-limiting examples, there are various mechanisms that a user can use to express his or her intent. One example is an affirmative opt-in or opt-out for specific behaviors. For example, a user may say she does not want a specific component to track her location, or she does not want Google analytics to know certain information about her. Another might be that the user sets a preference indicating the desire that the user does not want any third party components to have access to or view the user's location data.

In another example, an application policy may be implemented. For any app that has a component that performs an unidentified behavior, the Ad Network Detector will block the app from being installed on the user's phone or other device. These are behavior-based preferences that are manifested in the blockage of installation for any applications that may contain components that express such behaviors.

In one example, when an application is running on a user's phone, it should ask a preference service or a preference store (e.g., implemented on software server 127) what the preference is for the user and then respect that preference during execution. Information about user preferences for many users may be made available in a single online location so that a component can query and respect the preferences.

Regarding determining the components that are present in an application, the application can be identified and broken into components. After identification, there are various techniques that may be used to determine the behavior of those identified components. In some cases, structural comparisons of the call graphs of components in an application may be examined (e.g., determining which component is talking to the operating system of the mobile device, and which aspects of the operating system are involved). Other forms of static analysis may also be used that involve looking at the code inside of a component. By looking at the code, it can be determined whether the component can obtain a user's location, for example, or perform other functions. In one example, a knowledge base may be maintained that includes a list of components that are commonly distributed online and the corresponding behaviors of those components.

Also, dynamic analysis may be used, which is essentially running the application component in an emulated environment or on an actual device and detecting what is occurring (e.g., what services the component connects to or communicates with) on a user device to determine whether a component has a particular behavior. Additional details regarding determination of components and component attribution are provided in the section below titled "Analyzing Components of an Application".

In one example, the user may be presented with a screen that shows the applications installed on the user's device or the behaviors on the device (or even the full set of all behaviors that are possible on the device, even outside of the apps that the user has already installed on the device) and what applications/components the behaviors are attributed to.

In one example, a user can opt out of specific components. The user may be shown what components are on already her phone, or the user can say she does not want a certain type of behavior, and the Ad Network Detector only shows the user the specific network opt-outs that involve that behavior.

In another example, the user has expressed her preferences regarding behavior. An online preference service stores these preferences, and components are required to query the service prior to installation on a mobile device of the user. The service may be implemented on the mobile device, or on a separate server.

Additional information regarding various non-limiting examples of mobile devices and their usage more generally, including the presenting of information regarding a mobile device to a user, is described in previously-published U.S. Patent Application No. 2011/0047033 A1, published Feb. 24, 2011, entitled "SYSTEM AND METHOD FOR MOBILE DEVICE REPLACEMENT," by Mahaffey et al., the entire contents of which application is incorporated by reference as if fully set forth herein.

Figure 8:
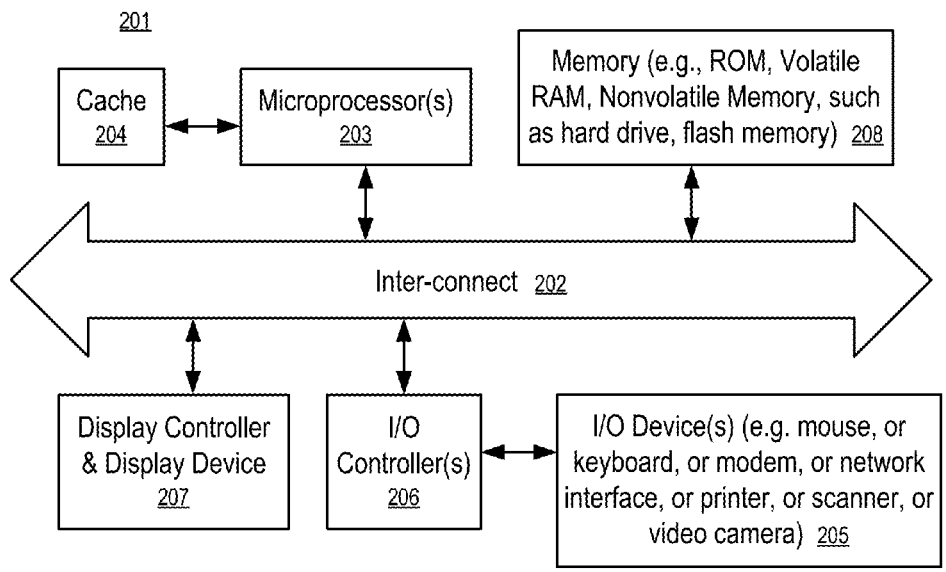
FIG. 8 shows a block diagram of a data processing system (e.g., a messaging server or an application server) which can be used in various embodiments.

FIG. 8 shows a block diagram of a data processing system (e.g., an identity server 110, a messaging server 125, application marketplace 123, or software server 127) which can be used in various embodiments. While FIG. 8 illustrates various components of a computer system, it is not intended to represent any particular architecture or manner of interconnecting the components. Other systems that have fewer or more components may also be used.

In FIG. 8, the system 201 includes an inter-connect 202 (e.g., bus and system core logic), which interconnects a microprocessor(s) 203 and memory 208. The microprocessor 203 is coupled to cache memory 204 in the example of FIG. 8.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 8 is used to implement application marketplace 123, messaging server 125, and/or other servers.

In another embodiment, a data processing system as illustrated in FIG. 8 is used to implement a user terminal, a mobile device, or another computing device on which an application is installed. A user terminal may be in the form, for example, of a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 9:
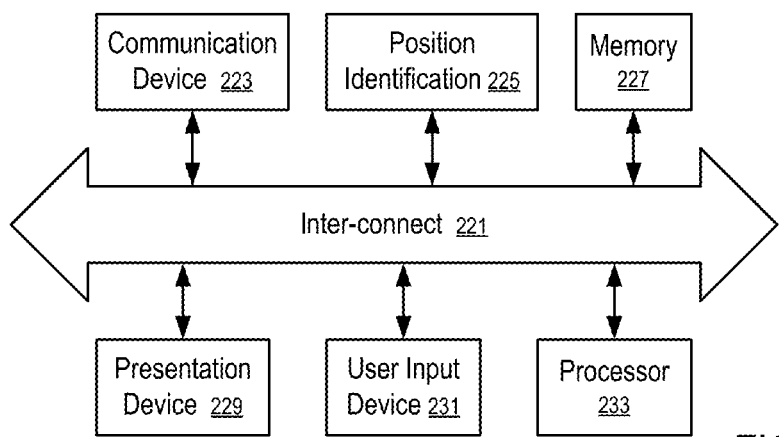
FIG. 9 shows a block diagram of a user device (e.g., a mobile device), according to one embodiment.

FIG. 9 shows a block diagram of a user device (e.g., a mobile device or user terminal) according to one embodiment. In FIG. 9, the user device includes an inter-connect 221 connecting the presentation device 229, user input device 231, a processor 233, a memory 227, a position identification unit 225 and a communication device 223.

In FIG. 9, the position identification unit 225 is used to identify a geographic location. The position identification unit 225 may include a satellite positioning system receiver, such as a Global Positioning System (GPS) receiver, to automatically identify the current position of the user device.

In FIG. 9, the communication device 223 is configured to communicate with a network server to provide data, including location data. In one embodiment, the user input device 231 is configured to receive or generate user data or content. The user input device 231 may include a text input device, a still image camera, a video camera, and/or a sound recorder, etc.

Analyzing Components of an Application

Various additional embodiments related to component analysis and attribution (e.g., identifying and determining components of an application) are now set forth below. The embodiments below do not limit the generality of any embodiments in the foregoing description.

In one embodiment, an application is a mobile application, which contains one or more components (e.g., a library, ad network or analytics software development kit (SDK), or other set of code designed to work together). A component identity (e.g., component identity 114) is information about a component. Examples of component identities include the following: a category (e.g. ad network, analytics, and malware SDK), authorship (e.g. Acme, Inc., John Smith), name of a component (e.g. "AdMob"), a range of versions or all versions of a component (e.g. AdMob 6.x, AdMob, zlib), and a particular version of a component (e.g. zlib 1.2.7, AdMob SDK 6.0.1). The data associated with a given component may be stored in database 112.

In one embodiment, a component's behavior is generally that behavior existing or occurring (e.g., functions performed) when a component is functioning on a computing device (e.g., functioning in an application 102 running on mobile device 149). One example of a behavior is the sending of certain types of data to a server (e.g. sending browser history to a server at www1.adcompany.com, or sending a location to a server at tracking.analyticscompany.net). Other examples include the following: accessing data on a computing device (e.g., contacts, call history); and performing certain functions on a device (e.g., changing brightness of a screen, sending a text message, making a phone call, pushing advertisements into a notification bar).

In one embodiment, a component's structure is how a component is implemented in code. This structure may include a code package and/or a code module structure. Also, a component's structure may include characteristics of the executable code of the component, such as for example, cross-references in a control flow/call graph, references to static data, and machine instructions used.

Various further embodiments related to component analysis are now described below. In a first embodiment, a non-transitory computer-readable storage medium stores computer-readable instructions, which when executed, cause a computing system to: for an application (e.g., one of applications 102) installed on a computing device (e.g., mobile device 149) of a user, determine components (e.g., components 104 and 106) of the application; and identify, via at least one processor, at least one behavior (e.g., sending device location to an ad server) associated with each of the components, including a first behavior associated with a first component. The instructions may cause the computing system to present, on a user display of the computing device, an identification of the components. The instructions may cause the computing system to determine at least one behavioral preference of the user.

In one embodiment, the instructions cause the computing system to store a user policy (e.g., user policy 108 or one of user policies 116) based at least in part on the at least one behavioral preference (e.g., user intents expressed by the user on a mobile device), and to enforce the user policy on new applications installed on the computing device.

In one embodiment, the instructions cause the first component to execute in conformance with results from a query of an identity server (e.g., identity server 110 or another computing device). The instructions may cause the computing system to, in response to installing the application, scan the application to confirm compliance with a user policy of the user, where the user policy stored on an identity server. In one embodiment, the instructions may cause the computing system to enforce, based on identified behaviors associated with the components, a user policy for each of the components.

The instructions may cause the computing system to compare permissible behaviors in the user policy for the components with the identified behaviors. In one example, the comparing of the permissible behaviors comprises determining behaviors, observed for the components on other computing devices, from a data repository (e.g., database 112). The instructions may cause the computing device to, in response to the determining the behaviors from the data repository, configure or disable execution of one or more of the components on the computing device.

In one embodiment, a system includes: a data repository (e.g., database 112) storing component data for known components, the component data including data for a first known component; at least one processor; and memory storing instructions, which when executed on a computing apparatus, cause the computing apparatus to: for a new component in a first application for a computing device of a user, perform a comparison of the new component to the component data; and based on the comparison, make a determination that the new component corresponds to the first known component.

In one embodiment, the instructions further cause the computing apparatus to, in response to the determination, perform at least one of: comparing a first known behavior of the first known component to a user policy of the user; and comparing an observed behavior of the new component to the user policy. In one embodiment, the component data includes component identities (e.g., component identities 114), each component identity corresponding to respective identifying information for a known component. In one embodiment, the determination is made prior to installing the new component on the computing device.

In one embodiment, the instructions further cause the computing apparatus to associate a similarity value (e.g., a value within an arbitrary range of zero to one) with the comparison, and wherein the determination is made in response to the similarity value being greater than a threshold value. In one embodiment, the comparison is based at least in part on a structure of the new component, the structure selected from the group consisting of a packaging structure, a module structure, and an executable code structure.

In one embodiment, the component data includes known structural characteristics and known behavioral characteristics. In one embodiment, the performing the comparison comprises comparing the known structural characteristics and the known behavioral characteristics to identified characteristics of the new component.

In one embodiment, the instructions further cause the computing apparatus to generate a notification when the identified characteristics are determined to differ from at least one of the known structural characteristics and the known behavioral characteristics. In one embodiment, the generating the notification comprises sending an alert to the computing device.

In one embodiment, a method includes: storing, in memory, component data for known components, the component data including data for a first known component; for a new component in a first application for a computing device of a user, perform, via at least one processor, a comparison of the new component to the component data; and based on the comparison, make a determination that the new component corresponds to the first known component.

In one embodiment, the new component is selected from the group consisting of code from the first application, and a library in the first application. In one embodiment, each of a plurality of different applications includes the new component, the new component corresponds to a set of behaviors when executed on a computing device, and the component data comprises behavioral data including the set of behaviors.

In one embodiment, the method further comprises associating the set of behaviors with the new component. In one embodiment, each of a plurality of computing devices has been observed when running a respective one of the different applications, and each of the plurality of computing devices exhibits the set of behaviors. In one embodiment, the determination is based in part on a context of operation of the new component on the computing device.

In one embodiment, the context is an accessing, during execution of the first application, of location information while the first application has a visible presence to a user (e.g., the first application is presenting location information to the user on a user display), and the set of behaviors includes determining a location of the computing device. In one embodiment, the component data includes a plurality of contexts each associated with at least one acceptable behavior. In one embodiment, the component data includes risk scores for known components, and the method further comprises providing a risk score in response to a query regarding an application installed or to be installed on the computing device of the user.

In one embodiment, a method comprises: storing, in memory, a first application comprising computer-readable instructions, which when executed, cause a mobile device of a user to: for a new component of a second application installed on the mobile device, perform a comparison of the new component to component data for known components, the component data including data for a first known component; and based on the comparison, make a determination that the new component corresponds to the first known component; and sending, via at least one processor, over a communication network, the first application for storage in a data processing system for subsequent installation from the data processing system onto the mobile device.

In one embodiment, a system includes: at least one processor; and memory storing a first application, which when executed on a mobile device of a user, causes the mobile device to: for a new component of a second application installed on the mobile device, perform a comparison of the new component to component data for known components, the component data including data for a first known component; and based on the comparison, make a determination that the new component corresponds to the first known component; and the memory further storing instructions configured to instruct the at least one processor to send the first application to a data processing system so that the first application can be later installed, over a communication network, on the mobile device from the data processing system.

Now discussing a component analysis process for one particular embodiment, a new application may be decomposed into identifiable components. An identity of each component may be displayed to the user. Behavioral and/or structural characteristics attributable to each component identity may be identified. The behavior for a given component may be displayed to the user.

A user policy (e.g., user policy 108) based on component behavior may be enforced on the user's computing device. For example, the user policy may require that there be no applications that send location to an advertising network. In another example, the user policy may require that no applications send identifiers to an advertising network.

Behavioral and/or structural characteristics of a component present in the new application may be identified. This may be, for example, an application 102 that has been installed on mobile device 149.

A comparison is made between the characteristics attributable to the component identity and the characteristics that have been identified in the new application. In one embodiment, if the identified characteristics are different from the characteristics attributable to the component identity, then an alert is generated to indicate that the behavior of the component has changed. The characteristics attributable to the component identity may be stored in database 112 of identity server 110 and may be accessed when making this comparison. For example, these attributable characteristics may be stored as component data associated with respective component identities 114 (i.e., known data regarding component behavior or other characteristics of a component may be stored for each component identity 114).

Now, further detail regarding how component analysis is performed is described below. As mentioned above, an application is decomposed into identifiable components. In particular, a data repository stores a set of component identities in a database.

Each component identity has identifying information for a given component that, if present in an application, indicates that the given component is present in the application. Examples of identifying information include the following: a package name prefix for a set of one or more classes, a class name, or a code fingerprint of a code block, method, class, package, etc.

When used, fingerprinting can be performed in a variety of ways. A first way is the creating of an abstract representation of an instruction set. Another way is to, from an abstract representation, create a set of n-gram indices that can create a fingerprint identifier for a set of code (e.g., a hash of indices) or that can be compared to another set of indices to perform a fuzzy match. In yet another way, asset or resource fingerprinting may be used. As a final way, fingerprinting may be done by analyzing the network traffic generated by an application on a device or in a dynamic analysis system. Server communication, network traffic destined to a server, may be used to associate a component with a particular network service. Some examples of network traffic include traffic to server with name server1.somewhere.com, traffic to server with IP 8.8.8.8 or 2001:4860:4860::8888, HTTP request with header "User-Agent: MyHttpLibrary-1.1", HTTP request with a particular URI or URI pattern, and traffic that matches a SNORT or YARA rule.

Analysis of a new application can be used to determine if identifying information for a given component identity matches the new application. If it matches, then the given component is present in the new application. This analysis can be done at the client (e.g., mobile device 149), the server (e.g., identity server 110), or using a combination thereof.

In one embodiment, the analysis is done at one computing device (e.g., either on the client or the server). The database of identifying information is stored locally on the computing device. The new application is also present locally (e.g., the new application itself has been previously sent to identity server 110 from mobile device 149, or from application marketplace or software server 127 prior to installation on mobile device 149).

In this embodiment, there are multiple options for analysis. In a first option, for each item of identifying information in the database, the new application is searched to determine if the identifying information matches the new application. Alternatively, information can be extracted from the new application, and then a check or comparison done to see if that information matches any of the identifying information stored in the database.

In another embodiment, a client computing device submits information to a server to determine components that are present in an application. The database of component identifying information (known component data) is stored on the server. The application is present on the client. The client extracts information (e.g., component identifying information) from the application, and then sends this extracted information to the server.

The server checks to see if the extracted information matches any of the identifying information in the database (e.g., the extracted information may be received as a query from mobile device 149). If so, the server sends back information about component identities to the client (e.g., the server sends results from the query to mobile device 149).

In a different embodiment, the client computing device submits an identifier for the new application to the server. This identifier may be, for example, a hash of the application binary code, a package name, a title of the application, or another form of application identifier. The server stores data regarding previously-analyzed applications. This data includes a list of components for each of the previously-analyzed applications.

The server uses the identifier received from the client and compares this identifier to the data regarding previously-analyzed applications. If there is a match between the identifier and a previously-analyzed application, then the components for that matched application (obtained from the stored list of components above) are determined to be in the new application (and this result may be sent to the client device). This matching to the database may be done similarly as was described earlier above for the component analysis on a single device. The server sends information about these identified component identities back to the client.

After a component has been identified as being present in an application, the identity of the component may be displayed to the user. For example, identification and display of components present in an application may be done similarly as was described above for the Ad Network Detector. Behavioral and/or structural characteristics that are attributable to a given component as stored in the database for various component identities may be sent from the server to the client device for those components that have been identified as being present in an application.

In one embodiment, there are various ways to identify characteristics that are actually present in a component of an application. For example, U.S. Patent Application Publication No. 2011/0047597, published on Feb. 24, 2011, and titled "System and Method for Security Data Collection and Analysis", by Mahaffey et al., which is incorporated by reference as if fully set forth herein, provides a general discussion about the gathering of information from an application on a mobile device for further processing at a server. According to this embodiment, information that has been gathered as described by Mahaffey et al. in U.S. Patent Application Publication No. 2011/0047597 is then used for component analysis at identity server 110 in order to identify characteristics of a component.

In another embodiment, behavioral characteristics may be determined or collected using other approaches. For example, behavior may be determined based on network traffic (e.g., SMS, IP) data, or based on the code source of a given behavior (e.g., a class name or a package name responsible for geo-locating, or a fingerprint of a code segment responsible for sending SMS traffic).

In one embodiment, component identity-attributable characteristics are compared to actually-present characteristics (e.g., as gathered for a new application just installed on a mobile device). For example, if behavior is part of the known data for a component identity, and a new application's component behavior matches this known behavior, then it is assumed that information about the component identity (e.g., in database 112) applies to the new application. Information about the component identity may include, for example, a text description, risk scoring, and data whether an application is malware or is not malware. For example, this information may be provided as a result or response to a query from a mobile device.

If the actual behavior and the known behavior for the component identity are different, this may indicate that the component in the new application is a newer version or a tampered-version, and that the component needs to be reviewed again in order to update the database. Also, an alert may be generated based on the component information determined above. For example, an email may be sent to an analyst to do further analysis of a component, or an entry may be created in a work queue regarding further component analysis to be done.

In various other embodiments, the results from component identification for applications on a device are presented to the user. The user may provide input in a user interface to define or update a user policy based on this component identification. For example, the user may opt-out of an identified component.

In another embodiment, a component review process is provided for reviewing potentially undesirable code at scale (where manual review is not practical). The component analysis as described above is automated so that a human is not required to do component analysis manually. Characterizing components that have been previously reviewed (e.g., stored as data for a component identity with a risk score) and determining when that component has changed behavior (i.e., the actual behavior is different from the known behavior stored in the component identity) can create an automated process where humans only need to re-review component code when its behavior has changed. A behavior change may also be associated with a code fingerprint having changed slightly (e.g., if doing a fuzzy match, there is a threshold for which it is considered that there is no change, and another threshold for which it is considered that that there is a match, but that there is a sufficient change in behavior). Similarly, other characteristics disclosed can be used to determine if the component in the new application exactly matches the known component or if it partially matches in a way that merits re-analysis.

Yet another embodiment relates to behavioral risk analysis of applications. In this embodiment, the component analysis involves separating identified components that have already been reviewed (i.e., components that have known component data stored in database 112), and that are common across numerous different applications (or across copies of the same application) as installed on many user devices, from components that are unique (e.g., an associated behavior has not been observed before) to a particular new application (e.g., behavior unique to a single, most-recent installation on mobile device 149). These unique behaviors are specifically audited within the context of the new application (e.g., application 102).

As an example of context, it is common for ad networks to ask for location data. This is a well-accepted behavior. If a user is looking, for example, at a game like Angry Birds, an application that asks for a location may be exhibiting acceptable behavior if this behavior is associated with an ad network that has been previously observed as being acceptable (e.g., as determined from data stored database 114). However, in other cases, actual game code that is itself asking for location may be inappropriate behavior.

The amount of code that is unique to any given application is typically fairly small. Most applications (e.g., for mobile devices) predominantly use code that is in at least one or many other applications (the majority of code in an application is typically not unique and there is a lot of commonality in code between applications).

Sometimes, when a behavior is analyzed in the context of a known SDK, the behavior is a repeatable behavior that has previously been determined to be acceptable (or to have a low risk score). Thus, for example, if a library has already been reviewed, then further analysis can be skipped.

In an embodiment regarding similarity of known and new applications, fuzzy matching and fingerprinting may be used (as was discussed above). For example, a similarity score of zero to one may be used. A similarity score is returned from the server after analysis of a new application. The code in the new application is compared to code that is already in the identified component library (e.g., a library in database 112 on identity server 110).

Typically, there is not an exact code similarity match because there are many changes that a compiler can make to a particular application installation to make it different than other installations. Similarities are defined so that if the differences are over a similarity threshold, then a determination is made that a known component is present in the newly-installed application. For example, the new application may be include a slightly-customized version of a component (that was previously determined to be acceptable). In other cases, the new application may include a new version of a component that has not been previously analyzed. In one embodiment, unacceptable code that has been only slightly modified to defeat similarity protection mechanisms is instead detected as unacceptable based on behavioral observation and component analysis as discussed above.

In one embodiment, components are analyzed with respect to similarity of previously known components. Behaviors can include use of personal identifying information or device information, or any actions that can be taken by applications on the device, including user interface displays, notifications, network communications, and file reading or writing actions. Policies to control or restrict the behavior of applications and their components may be defined and applied. This can include the identification of advertising networks and defining policies to permit various opt-out actions for these advertising networks.

Closing

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   collect prior component data in a data repository, the prior component data associated with prior known behavior for a known component common to at least one application installed on at least one mobile device other than a mobile device of a user;
   storing, in a memory, a first application comprising computer-readable instructions, which when executed after installation of the first application onto the mobile device of the user, cause the mobile device to:
      determine components of a second application to be installed on the mobile device, the second application comprising components packaged within the second application, and the components including a first component;
      identify a respective set of behaviors associated with each of the components of the second application, wherein a first set of behaviors includes a first behavior associated with the first component, wherein the identifying comprises comparing the first behavior to the prior known behavior by accessing, over a communication network, the prior component data, and wherein each of the first set of behaviors is a behavior that occurs when a component associated with the behavior is functioning in an application running on a mobile device;
      determine compliance of the second application with at least one behavioral preference of the user, wherein the at least one behavioral preference comprises at least one of: opting out of the first behavior, opting out of one or more of the components including the first component, or a set of user preferences for specifically-identified behaviors; and
      block installation of the second application on the mobile device of the user when the second application fails the compliance; and
   sending, via at least one processor, over a communication network, the first application for storage in a data processing system, the first application to be subsequently installed onto the mobile device of the user from the data processing system.

2. The method of claim 1, further comprising communicating, via the at least one processor, with the first application after installation of the first application on the mobile device of the user.

3. The method of claim 1, wherein the data processing system comprises an application marketplace.

4. The method of claim 1, wherein a network operator controls the data processing system, and the mobile device of the user is configured to operate with a cellular network operated by the network operator.

5. The method of claim 1, wherein the first component is a linked library packaged with the second application prior to installation of the second application on the mobile device of the user.

6. A system, comprising:
   a data repository to store prior component data associated with prior known behavior for a known component common to at least one application installed on at least one mobile device other than a mobile device of a user;
   at least one processor; and
   memory storing a first application, which when executed on the mobile device of the user after installation of the first application on the mobile device, causes the mobile device to:

determine components of a second application to be installed on the mobile device, the second application comprising components packaged within the second application, and the components including a first component;

identify a respective set of behaviors associated with each of the components of the second application, wherein a first set of behaviors includes a first behavior associated with the first component, wherein the identifying comprises comparing the first behavior to the prior known behavior based on the prior component data in the data repository, and wherein each of the first set of behaviors is a behavior that occurs when a component associated with the behavior is functioning in an application running on a mobile device;

determine at least one behavioral preference of the user, the at least one behavioral preference comprising at least one of: opting out of the first behavior, opting out of one or more of the components including the first component, or a set of user preferences for specifically-identified behaviors;

determine compliance of the second application with the at least one behavioral preference, wherein the at least one behavioral preference includes a preference regarding the first behavior; and block installation of the second application on the mobile device of the user when the second application fails the compliance; and the memory further storing instructions configured to instruct the at least one processor to send the first application to a data processing system so that the first application can be later installed, over a communication network, on the mobile device of the user from the data processing system.

7. The system of claim 6, wherein the instructions are further configured to instruct the at least one processor to communicate with the first application after installation of the first application on the mobile device of the user.

8. The system of claim 6, wherein the first application further causes the mobile device of the user to display opt-out options to the user, wherein the opt-out options are solely for applications already installed on the mobile device of the user.

9. The system of claim 6, wherein the first application further causes the mobile device of the user to display opt-out options to the user, the opt-out options comprising possible opt-out flows for the user on the mobile device of the user as determined from a database.

10. The system of claim 6, wherein the first component is a portion of the executable code of the second application, and the executable code enables the second application to interact with an advertising network or an analytics network.

11. A method, comprising:

storing, in a data repository, by at least one processor, component data for a known component of applications installed on mobile devices of a plurality of users, the component data comprising a prior known behavior for the known component;

receiving, by the at least one processor, at least one behavioral preference of a first user from a mobile device of the first user executing a first application, the at least one behavioral preference determined by the first application based on input from the first user;

storing, in a memory, the at least one behavioral preference;

communicating, by the at least one processor, with the first application, the first application identifying a first set of behaviors on the mobile device, wherein the first set of behaviors includes a first behavior associated with a first component of a second application being installed on the mobile device, the second application comprising components packaged within the second application including the first component, and wherein each of the first set of behaviors is a behavior that occurs when a component associated with the behavior is functioning in an application running on a mobile device;

comparing, by the at least one processor, the first behavior to the prior known behavior using the component data in the data repository; and based on the comparing, determining, by the at least one processor, that the second application violates the at least one behavioral preference;

wherein the at least one behavioral preference comprises at least one of: opting out of the first behavior, opting out of one or more of the components including the first component, or a set of user preferences for specifically-identified behaviors.

12. The method of claim 11, further comprising storing the first set of behaviors identified by the first application.

13. The method of claim 11, further comprising receiving a query from an advertisement network, associated with the first component, the query requesting the at least one behavioral preference of the first user.

14. The method of claim 11, further comprising:

receiving, from the mobile device of the first user, an identification of the first component; and running, by the at least one processor, the first component in an emulated environment to determine whether the first behavior is active.

15. The method of claim 11, further comprising providing information in response to a request, received over a communication network, in order to evaluate the at least one behavioral preference and determine how the first component is to behave on the mobile device of the first user.

16. A non-transitory computer-readable storage medium storing computer-readable instructions, which when executed, cause a computing apparatus to:

collect prior component data in a data repository, the prior component data associated with prior known behavior for a known component common to at least one application installed on at least one computing device other than a computing device of a user;

receive a selection of at least one behavioral preference from the user;

after the collecting the prior component data, in response to downloading an application on the computing device of the user, wherein the application comprises components packaged within the application, determine the components of the application, the components including a first component;

identify, via at least one processor, a respective set of behaviors associated with each of the components of the downloaded application, wherein a first set of behaviors includes a first behavior associated with the first component, wherein the identifying comprises comparing the first behavior to the prior known behavior based on the prior component data in the data repository, and wherein each of the first set of behaviors is a behavior that occurs when a component associated with the behavior is functioning in an application running on a computing device;

based on the comparing, determine that the first component corresponds to the known component;

determine whether the downloaded application complies with the at least one behavioral preference; and in response to the downloaded application violating the at least one behavioral preference, block installation of the application on the computing device of the user;

wherein the at least one behavioral preference comprises at least one of: opting out of the first behavior, opting out of one or more of the components including the first component, or a set of user preferences for specifically-identified behaviors.

17. The storage medium of claim 16, wherein the at least one behavioral preference comprises at least a policy, and the instructions further cause enforcing the policy on new applications installed on the computing device of the user.

18. The storage medium of claim 16, wherein the at least one behavioral preference comprises at least opting out of the first behavior, and the instructions further cause, after the opting out, running the first component to determine whether the first behavior is active.

19. The storage medium of claim 16, wherein the at least one behavioral preference comprises at least opting out of the first behavior, and the instructions further cause, after the opting out, determining a status of the opting out using an application programming interface of the first component.

20. The storage medium of claim 16, wherein the instructions further cause the computing apparatus to, in response to the selection of the at least one behavioral preference, reconfigure execution of the first component so that the first behavior no longer occurs on the computing device of the user.

21. A non-transitory computer-readable storage medium storing computer-readable instructions, which when executed, cause a computing apparatus to:

collect prior component data in a data repository, the prior component data associated with prior known behavior for a known component common to at least one application installed on at least one computing device other than a computing device of a user;

for an application to be installed on the computing device of the user, determine components of the application, the application comprising components packaged within the application, and the components including a first component;

identify, via at least one processor, a respective set of behaviors associated with each of the components of the application to be installed, wherein a first set of behaviors includes a first behavior associated with the first component, wherein the identifying comprises comparing the first behavior to the prior known behavior based on the prior component data in the data repository, and wherein each of the first set of behaviors is a behavior that occurs when a component associated with the behavior is functioning in an application running on a computing device;

determine at least one behavioral preference of the user, wherein the at least one behavioral preference comprises at least one of: opting out of the first behavior, opting out of one or more of the components including the first component, or a set of user preferences for specifically-identified behaviors;

scan the application to be installed to determine compliance with the at least one behavioral preference of the user; and in response to the application to be installed violating the at least one behavioral preference, block installation of the application.

22. The storage medium of claim 21, wherein the instructions further cause storing the at least one behavioral preference on the computing device of the user so that the application to be installed can locally determine the at least one behavioral preference.

23. The storage medium of claim 21, wherein the instructions further cause the first component to execute in conformance with results from a query of a different computing device, wherein the query includes a user identifier of the user.

* * * * *

UNITED STATES PATENT AND TRADEMARK OFFICE
CERTIFICATE OF CORRECTION

PATENT NO. : 9,215,074 B2  
APPLICATION NO. : 13/786210  
DATED : December 15, 2015  
INVENTOR(S) : Wyatt et al.

Page 1 of 1

It is certified that error appears in the above-identified patent and that said Letters Patent is hereby corrected as shown below:

IN THE SPECIFICATION

In Column 22, Line 8, delete "be".

Signed and Sealed this  
Fifth Day of April, 2016

Michelle K. Lee  
*Director of the United States Patent and Trademark Office*